(12) United States Patent
Tripathi et al.

(10) Patent No.: US 9,858,104 B2
(45) Date of Patent: Jan. 2, 2018

(54) CONNECTING FABRICS VIA SWITCH-TO-SWITCH TUNNELING TRANSPARENT TO NETWORK SERVERS

(71) Applicant: Pluribus Networks, Inc., Palo Alto, CA (US)

(72) Inventors: Sunay Tripathi, Los Altos, CA (US); Roger Chickering, Palo Alto, CA (US); Jon Gainsley, Palo Alto, CA (US)

(73) Assignee: Pluribus Networks, Inc., Palo Alto, CA (US)

( * ) Notice: Subject to any disclaimer, the term of this patent is extended or adjusted under 35 U.S.C. 154(b) by 137 days.

(21) Appl. No.: 14/860,576

(22) Filed: Sep. 21, 2015

(65) Prior Publication Data

US 2016/0087885 A1    Mar. 24, 2016

Related U.S. Application Data

(60) Provisional application No. 62/054,891, filed on Sep. 24, 2014.

(51) Int. Cl.
*H04L 12/46* (2006.01)
*G06F 9/455* (2006.01)
*H04W 76/02* (2009.01)

(52) U.S. Cl.
CPC ...... *G06F 9/45558* (2013.01); *H04W 76/022* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,378,161 | B1* | 6/2016 | Dalal | G06F 13/16 |
| 2008/0198858 | A1* | 8/2008 | Townsley | H04L 12/4641 370/401 |
| 2013/0318268 | A1* | 11/2013 | Dalal | G06F 13/1652 710/113 |
| 2015/0180773 | A1* | 6/2015 | DeCusatis | H04L 12/4641 370/392 |
| 2015/0334018 | A1* | 11/2015 | Kutch | H04L 45/745 370/254 |
| 2015/0350081 | A1* | 12/2015 | DeCusatis | H04L 47/12 370/235 |

* cited by examiner

*Primary Examiner* — Fan Ng
(74) *Attorney, Agent, or Firm* — Martine Penilla Group, LLP

(57) ABSTRACT

A network switch includes ports, memory, and a processor. The switch is operable to switch packets of a layer 2 network, and the memory is for storing a tunneling engine computer program. The processor executes the tunneling engine, where the processor identifies a second switch operable to switch layer-2 network packets. The identification includes detecting that the second switch is connected to the network switch over a layer 3 connection, and the tunneling engine creates a tunnel over the layer 3 connection between the switches to exchange layer-2 packets. The tunnels encapsulates and decapsulates the packets that are exchanged between the switches. When the processor determines that a packet from a first node to a second node that is connected to the second switch, the processor creates an encapsulation flow on the network switch to encapsulate packets from the first node to the second node over the tunnel.

21 Claims, 15 Drawing Sheets

| switch | port | ip | hostname | rport | status |
|---|---|---|---|---|---|
| aquila02 | 4 | 192.168.20.121 | spine01 | 5 | up,PN-fabric,LLDP,trunk |
| aquila02 | 8 | 192.168.20.121 | spine01 | 4 | up,PN-fabric,LLDP,trunk |
| aquila02 | 36 | 192.168.20.3 | pn-dev01 | 63 | up,PN-fabric,STP-BPDUs,LLDP,trunk |
| aquila02 | 40 | 192.168.20.122 | spine02 | 4 | up,PN-fabric,LLDP,trunk |
| aquila02 | 41 | 192.168.2.41 | pn-dev02 | 41 | up,PN-fabric,LLDP,trunk |
| aquila02 | 42 | 192.168.2.41 | pn-dev02 | 42 | up,PN-fabric,LLDP,trunk |
| aquila02 | 43 | 192.168.2.41 | pn-dev02 | 43 | up,PN-fabric,LLDP,trunk |
| aquila02 | 44 | 192.168.2.41 | pn-dev02 | 44 | up,PN-fabric,LLDP,trunk |
| aquila02 | 48 | 192.168.2.61 | pn-dev03 | 36 | up,PN-fabric,STP-BPDUs,LLDP,trunk |
| spine02 | 4 | 192.168.2.31 | aquila02 | 40 | up,PN-fabric,LLDP,trunk |
| spine02 | 5 | 192.168.2.31 | aquila02 | 13 | up,PN-fabric,LLDP,trunk |
| spine01 | 13 | 192.168.20.121 | spine01 | 8 | up,PN-fabric,STP-BPDUs,LLDP,trunk,vlag-active |
| spine01 | 4 | 192.168.20.122 | spine02 | 5 | up,PN-fabric,PN-cluster,STP-BPDUs,LLDP,trunk,vlag-active |
| spine01 | 5 | 192.168.20.3 | pn-dev01 | 60 | up,PN-fabric,LLDP,trunk,vlag-active |
| cruxb3 | 13 | 192.168.20.3 | pn-dev01 | 64 | up,PN-fabric,PN-cluster,STP-BPDUs,LLDP,trunk,vlag-active |
| cruxb3 | 43 | 192.168.20.3 | pn-dev01 | 59 | up,PN-fabric,STP-BPDUs,LLDP,trunk |
| cruxb1 | 43 | 192.168.20.3 | pn-dev01 | 62 | up,PN-fabric,STP-BPDUs,LLDP,trunk |
| cruxb0 | 43 | 192.168.20.3 | pn-dev01 | 61 | up,PN-fabric,STP-BPDUs,LLDP,trunk |
| cruxa3 | 43 | 192.168.20.3 | pn-dev01 | 23 | up,PN-fabric,STP-BPDUs,LLDP,trunk |
| cruxa2 | 43 | 192.168.20.3 | pn-dev01 | 57 | up,PN-fabric,STP-BPDUs,LLDP,trunk |
| cruxa0 | 43 | 192.168.20.113 | cruxa0 | 43 | up,PN-fabric,STP-BPDUs,LLDP,trunk |
| pn-dev01 | 23 | 192.168.20.117 | cruxa3 | 43 | up,PN-fabric,STP-BPDUs,LLDP,trunk |
| pn-dev01 | 57 | 192.168.20.116 | cruxa2 | 43 | up,PN-fabric,STP-BPDUs,LLDP,trunk |
| pn-dev01 | 59 | 192.168.20.112 | cruxb3 | 43 | up,PN-fabric,STP-BPDUs,LLDP,trunk |
| pn-dev01 | 60 | 192.168.20.118 | cruxb0 | 13 | up,PN-fabric,STP-BPDUs,LLDP,trunk |
| pn-dev01 | 61 | 192.168.20.111 | cruxb0 | 43 | up,PN-fabric,STP-BPDUs,LLDP,trunk |
| pn-dev01 | 62 | 192.168.20.114 | cruxb1 | 43 | up,PN-fabric,STP-BPDUs,LLDP,trunk |
| pn-dev01 | 63 | 192.168.20.118 | cruxb2 | 43 | up,PN-fabric,STP-BPDUs,LLDP,trunk |
| pn-dev01 | 64 | 192.168.2.31 | aquila02 | 36 | up,PN-fabric,STP-BPDUs,LLDP,trunk |
| pn-dev03 | 46 | 192.168.2.31 | aquila02 | 10 | up,PN-fabric,STP-BPDUs,LLDP,trunk |
| pn-dev02 | 41 | 192.168.2.31 | aquila02 | 43 | up,PN-fabric,LLDP,trunk |
| pn-dev02 | 42 | 192.168.2.31 | aquila02 | 42 | up,PN-fabric,LLDP,trunk |
| pn-dev02 | 43 | 192.168.2.31 | aquila02 | 43 | up,PN-fabric,LLDP,trunk |
| pn-dev02 | 44 | 192.168.2.31 | aquila02 | 44 | up,PN-fabric,LLDP,trunk |

Fig. 3

MAC Table

| MAC address |
| VLAN ID |
| VXLAN |
| Destination Switch |
| Port or tunnel flag |
| Egress Port ID |
| Tunnel ID |
| Policy Pointer |
| Type (Dynamic, Static) |
| Age |
| Time entry created |
| Last Used |
| Frequency of Use |
| ... | index { MAC address, VLAN ID, VXLAN }

Fig. 5B

Performance comparison of Server-to-Server tunnel vs Switch-to-Switch tunnel

| Test configuration | Bandwidth | CPU Utilization |
|---|---|---|
| 1. Server to server performance | 9.41Gbps | |
| 2. VM1 (server1, subnet1) to VM2 (server2, subnet2) | 9Gbps | 50% of a core on receiver and 20% of a core on sender |
| 3. VM1 (server1, subnet1) to VM2 (server2, subnet1) with vxlan server-to-server tunnel | 3Gbps | 80% of a core on receiver and 60% of a core on sender |
| 4. VM1 (server1, subnet1) to VM2 (server2, subnet1) with vxlan switch-to-switch tunnel | 9.93Gbps | 50% of a core on receiver and 20% of a core on sender |

Fig. 8

CONNECTING FABRICS VIA SWITCH-TO-SWITCH TUNNELING TRANSPARENT TO NETWORK SERVERS

CLAIM OF PRIORITY

This application claims priority from U.S. Provisional Patent Application No. 62/054,891, filed Sep. 24, 2014, and entitled "Connecting Fabrics Via Switch-To-Switch Tunneling Transparent to Network Servers." This provisional application is herein incorporated by reference.

BACKGROUND

1. Field of the Invention

The present embodiments relate to systems, methods, and computer programs for managing network traffic, and more particularly, systems, methods, and computer programs for implementing a distributed switch layer fabric to define tunnels directly via switches.

2. Description of the Related Art

The proliferation of network devices has resulted in complex networking strategies to distribute packets in a network efficiently. In some solutions, multitier switching devices are used to build the network, but these complex multitier solutions do not provide an efficient distribution of packets at the level 2, and the management of these multitier switches is difficult and inflexible.

In addition, with the exponential growth of virtual machines on the network, the number of devices continues to grow exponentially. The addition of virtual networks, that include virtual machines and other network devices, requires an efficient separation of traffic between the different virtual networks, which is difficult to implement in the multitier switching architecture.

It is in this context that embodiments arise.

SUMMARY

Systems, devices, methods, and computer programs are presented for implementing a distributed layer 2 fabric. In one embodiment, tunnels are created at the switch level, freeing servers from having to establish and manage server-to-server tunnels. Once the tunnels are created at the switches, the servers simply utilize layer 2 connections, as if the servers were on the same layer 2 network. It should be appreciated that the present embodiments can be implemented in numerous ways, such as a method, an apparatus, a system, a device, or a computer program on a computer readable medium. Several embodiments are described below.

In one embodiment, a network switch includes a plurality of ports, a memory, and a processor. The network switch is operable to switch packets of a layer 2 network received on the plurality of ports, and the memory is configured for storing a tunneling engine computer program. The processor is operable to execute the tunneling engine, where the processor is operable to identify a second switch operable to switch packets of the layer 2 network. The identification includes detecting that the second switch is connected to the network switch over a layer 3 connection, and the tunneling engine is operable to create a tunnel over the layer 3 connection between the network switch and the second switch to exchange packets of the layer 2 network. The exchange of packets over the tunnel includes encapsulation and decapsulation of the packets that are exchanged between the network switch and the second switch. When the processor determines that a received packet of the layer 2 network is from a first node and addressed to a second node, where the second node is connected to the second switch, the processor creates an encapsulation flow on the network switch to encapsulate packets from the first node to the second node over the tunnel, and the processor utilizes the tunneling engine to send the packet from the network switch to the second switch over the tunnel using the encapsulation and decapsulation, the tunnel being created without processing by the first node or the second node.

In another embodiment, a method includes an operation for identifying, at a network switch operable to switch packets of a layer 2 network, a second switch operable to switch packets of the layer 2 network, the identifying including detecting that the second switch is connected to the network switch over a layer 3 connection. Further, the method includes an operation for creating, at the network switch, a tunnel over the layer 3 connection between the network switch and the second switch to exchange packets of the layer 2 network, the exchange of packets over the tunnel including encapsulation and decapsulation of the packets that are exchanged between the network switch and the second switch. In addition, the method includes operations for receiving, at the network switch, a packet of the layer 2 network, the packet being from a first node and addressed to a second node, and for determining, at the network switch, that the second node is connected to the second switch. In addition, the method includes an operation for creating an encapsulation flow on the network switch to encapsulate packets from the first node to the second node over the tunnel.

In yet another embodiment, a non-transitory computer-readable storage medium, storing a computer program, includes program instructions for identifying, at a network switch operable to switch packets of a layer 2 network, a second switch operable to switch packets of the layer 2 network, the identifying including detecting that the second switch is connected to the network switch over a layer 3 connection;

program instructions for creating, at the network switch, a tunnel over the layer 3 connection between the network switch and the second switch to exchange packets of the layer 2 network, the exchange of packets over the tunnel including encapsulation and decapsulation of the packets that are exchanged between the network switch and the second switch. Further, the method includes program instructions for receiving, at the network switch, a packet of the layer 2 network, the packet being from a first node and addressed to a second node, and program instructions for determining, at the network switch, that the second node is connected to the second switch. Further yet, the method includes program instructions for creating an encapsulation flow on the network switch to encapsulate packets from the first node to the second node over the tunnel.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 3 illustrates a switch connectivity table, according to one embodiment.

FIG. 5B is a MAC table entry, according to one or more embodiments.

FIG. 8 is a table showing the results of testing VM-to-VM traffic under different configurations, according to one embodiment.

DETAILED DESCRIPTION

The following embodiments describe systems, devices, methods, and computer programs for a distributed network device operating system (ndOS). It will be apparent, that the present embodiments may be practiced without some or all of these specific details. In other instances, well known process operations have not been described in detail in order not to unnecessarily obscure the present embodiments.

Embodiments presented herein provided for methods to connect two level 2 fabrics, an operation also referred to herein as a fabric connect, when the fabrics are not directly connected but are connected over a layer 3 network. One technique that is available for making server-to-server tunnels is to use VXLAN tunnels that are managed by the software of the servers themselves. However, management of such server tunnels adds additional processing strain to server processing and also complicates certain tunneling processes. Some of these processes include migration of VMs over VXLAN tunnels. However, due to the complication of managing the software and processing load on the servers, migration can be slow, unreliable, or introduce management overhead and delays.

Embodiments presented herein to connect layer 2 pods have several benefits:

Server nodes and virtual machines work without changes in a network pod, where the pod can be a single rack or can be multiple racks in the same layer 2 domain. The server nodes don't have to create tunnels or deal with tunnels at all.

Fabric connect allows two switches to tunnel layer 2 traffic over layer 3 and to connect two pods separated by a layer 3 boundary (e.g., different data centers separated by a WAN) combining the two pods into a single logical layer 2 network.

The switches establish a tunnel from switch to switch (e.g., a VXLAN tunnel) to connect the two separate pods allowing VMs to migrate freely and use the switch ASIC based VXLAN encapsulation/decapsulation to run line rate performance.

Server nodes don't have to lose performance due to the implementation of software-based tunnels, and it is no longer necessary to deal with the administrative complexity of tunnels on servers.

Figure 1:
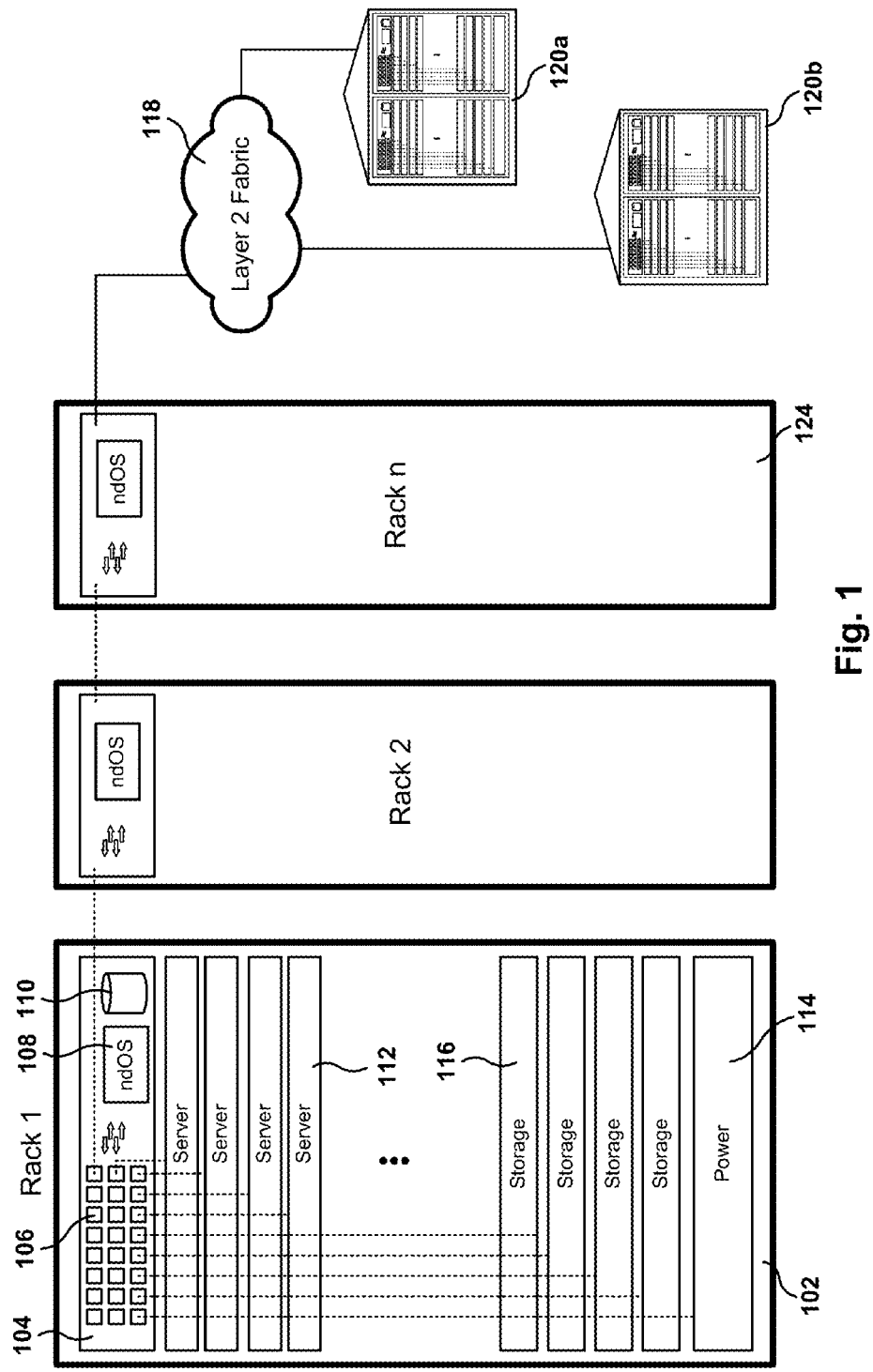
FIG. 1 illustrates the architecture of a distributed network device operating system (ndOS), according to one embodiment.

FIG. 1 illustrates the architecture of a distributed network device operating system (ndOS), according to one embodiment. The network environment of FIG. 1 includes a rack 102 with a plurality of servers 112, storage devices 116, power supplies 114, etc. In addition, rack 102 includes a switch 104.

Switch 104 includes an instance of the ndOS, permanent storage 110, and a plurality of Ethernet ports 106. The ndOS is a distributed network device operating system that spans a plurality of layer-2 devices (e.g., switches) across the network. The ndOS is also referred to herein as network operating system, layer-2 operating system, or distributed-switching operating system. An ndOS fabric is a collection of ndOS switches that share configuration and state information. Switches in a fabric work together to provision the resources allocated by the configuration and to manage state information across the fabric.

A switch running ndOS discovers other switches running ndOS using layer 2 and layer 3 discovery protocols. Each switch can be in its own fabric or the administrator can decide to join a switch to an existing fabric at any time. The ndOS fabric synchronizes the configuration and state across all switches in the fabric using TCP/IP.

When a ndOS switch comes up or any time a link changes state, ndOS uses a combination of LLDP messages, multicast, and routing protocols to discover switch adjacencies and underlying topology. The switches are not required to be connected directly but each switch knows the ports through which other switches are connected.

When a new ndOS switch comes up, it goes through a short discovery phase to determine other fabrics that are visible directly or indirectly. As part of the ndOS switch setup, an administrator may choose to join an existing fabric and retrieve the configuration along with the transaction log from one of the switches in the fabric. In one embodiment, the fabric operates in synchronous mode for configuration, so it doesn't matter which switch the configuration is retrieved from. The joining of a new ndOS switch to a fabric is itself a fabric transaction so every switch is aware of the fact that a new switch has joined the fabric.

The interconnected switches with ndOS provide what appears to be a single logical switch that spans a plurality of switches, even switches located in geographically separated data centers 120a and 120b. The switches with ndOS build a layer-2 fabric that expands beyond a single switch and a single data center. As used herein, switching devices with ndOS are also referred to herein as ndOS switches or server-switches.

In one embodiment, configuration and state is shared between switches using a multi-threaded event queue over TCP/IP. When strict synchronization is required (for configuration changes or switching table updates in multi-path environments), ndOS employs a three-phase commit protocol to ensure consistency across all switches. To change the configuration across the fabric, all switches must participate and agree to the change. In one embodiment, if any switch is unreachable, the current implementation fails the operation and raises an event instructing the administrator to either manually evict the unreachable node or bring it back on line. A switch that is manually evicted can rejoin the fabric and automatically synchronize configuration and state as part of rejoining the fabric. While a switch is unreachable, configuration changes are not allowed but the system still operates normally based on the existing configuration. In one embodiment, the fabric protocol uses TCP/IP for communication. The switches that make up a fabric can be separated by other switches, routers, or tunnels. As long as the switches have IP connectivity with each other they can share fabric state and configuration.

An administrator or orchestration engine for a ndOS switch can create a hardware tunnel between two switches to provide layer 2 encapsulation over layer 3. Since ndOS switch chips support encapsulation/decapsulation in hardware, ndOS allows for tunneling layer 2 over layer 3 using a switch chip as an offload engine. The ndOS flow programming capability and encapsulation/decapsulation offload allows two virtual machines on the same layer 2 domain but separated by a layer 3 domain to communicate at line rates without any performance penalties.

As used herein, layer 2, named the data link layer, refers to the second layer of the OSI network model. In addition, it is noted that although the switches are described with reference to a layer 2 implementation, other layers in the OSI model may also be utilized to interconnect switches (e.g., remote switches may be connected via tunneling using an Internet protocol (IP) network), and some of the operations performed by the switches may expand into other layers of the OSI model. The layer 2 fabric is also referred to herein as the switch layer fabric or the layer 2 switch fabric.

The conceptual use of a single layer 2 fabric allows the creation of application specific flows and virtual networks with hardware-based isolation and hardware-based Service Level Agreements (SLAs). The scope of virtual networks and application flows can be restricted to individual switches (or ports within a switch) or can be extended to switch clusters and entire layer 2 fabrics. As a result, end-to-end resource management and guaranteed SLAs are provided.

In one embodiment, the ndOS manages the physical network boxes and the fabric (the collection of ndOS instances) of ndOS switches like a hypervisor manages an individual server. The ndOS can spawn isolated networks with guaranteed performance levels that are virtually indistinguishable from an application point of view, from a physical network. This functionality is similar to how a hypervisor spawns virtual machines that look and act as physical machines.

Switch management tools allow network administrators to manage the complete layer-2 fabric—such as viewing, debugging, configuring, changing, setting service levels, etc.—including all the devices in the layer-2 fabric. For example, individual switches may come online and automatically join the existing fabric. Once in the fabric, devices can be allocated into local, cluster, or fabric-wide pools. In a given pool of switches, resource groups (physical and virtual servers and virtual network appliances) are managed with defined policies that include definitions for bandwidth, latency, burst guarantees, priorities, drop policies, etc.

The ndOS, and the ndOS switches, may create application flows and virtual networks on the fabric. SLAs (e.g., access control lists (ACL), VLAN tags, guaranteed bandwidth, limits on bandwidth, guaranteed latency, priority on shared resources, performance of network services such as firewalls and load balances and others, etc.) become attributes of each application flow or virtual network. These attributes are managed by the network operating system, and virtual machines are free to communicate within the scope of their virtual networks.

In one embodiment, the ndOS switches include a switch fabric, a processor, permanent storage, and network packet processors, which enable massive classification and packet copying at line rates with no latency impact. The network operating system may dynamically insert probes with no hardware or physical reconfiguration at any point in the fabric and copy full or filtered packet streams to the ndOS itself with meta-information such as nanosecond level timestamps, ingress port, egress port, etc. As a result, fabric-wide snooping and analytics are both flexible and with no impact on performance.

In one embodiment, the ndOS captures streams (e.g., 40 Gbps per ndOS switch) and stores them on non-volatile storage (e.g., 1 terabyte). Rolling logs permit post-processing and re-creation of entire application flows across the fabric. The ndOS is also able to track link-level latency of each application and virtual network along with additional comprehensive statistics. In one embodiment, the statistics include which machine pairs are communicating, connection life-cycles between any machines, packet drops, queuing delays, etc. The network operating system tracks fine-grained statistics and stores them in permanent storage to permit inspection of history at a point in time or over a period of time. Further, the probe points may implement counters or copy the packets without adding any latency to the original stream, or the probes may increment double-buffered counters which can be direct memory mapped into the network operating system and allow user applications running on the switch to make real time decisions.

In one embodiment, the ndOS is also a hypervisor and thus can run standard network services like load balancers, firewalls, etc. Further, the ndOS allows switches to discover other switches. In one embodiment, all ndOS instances know about each other using a multicast-based messaging system. In one embodiment, ndOS switches periodically send multicast messages on a well-known address, the multicast messages including the senders' own IP address and a unique switch identifier (ID). In one embodiment, this multicast message is also utilized as a keep-alive message.

In addition, ndOS switches may create direct connections with each other to reliably exchange any information. Each ndOS instance keeps track of the local configuration information but also keeps track of global information (e.g., MAC address tables). An administrator is able to connect to any ndOS instance (using ndOS provided application programming interfaces (API) and other interfaces) and configure any particular switch, or change the global configuration or resource policies, which are reliably communicated to other ndOS instances in the fabric using a two-phase commit, or some other procedure. In phase 1 of the two-phase commit, resources are reserved and in phase 2 resources are committed. From the management perspective, the administrator has a global view of the entire layer-2 fabric and is able to apply local or global configuration and policies to any ndOS instance.

In one embodiment, the ndOS also enables administrators to configure notification of events related to changes in the fabric (e.g., switches being added or deleted), changes in link status, creation of virtual machines (VMs), creation, deletion, or modification of a network-hosted physical or virtual storage pool, etc. The clients can interact with an ndOS instance on a local switch, or on any switch in the fabric. The fabric itself reliably ensures that one or more switches get configured appropriately as needed.

It is noted that the embodiments illustrated in FIG. 1 are exemplary. Other embodiments may utilize different topologies, configuration, have a mixture of devices with ndOS and without ndOS, etc. The embodiments illustrated in FIG. 1 should therefore not be interpreted to be exclusive or limiting, but rather exemplary or illustrative.

Figure 2A:
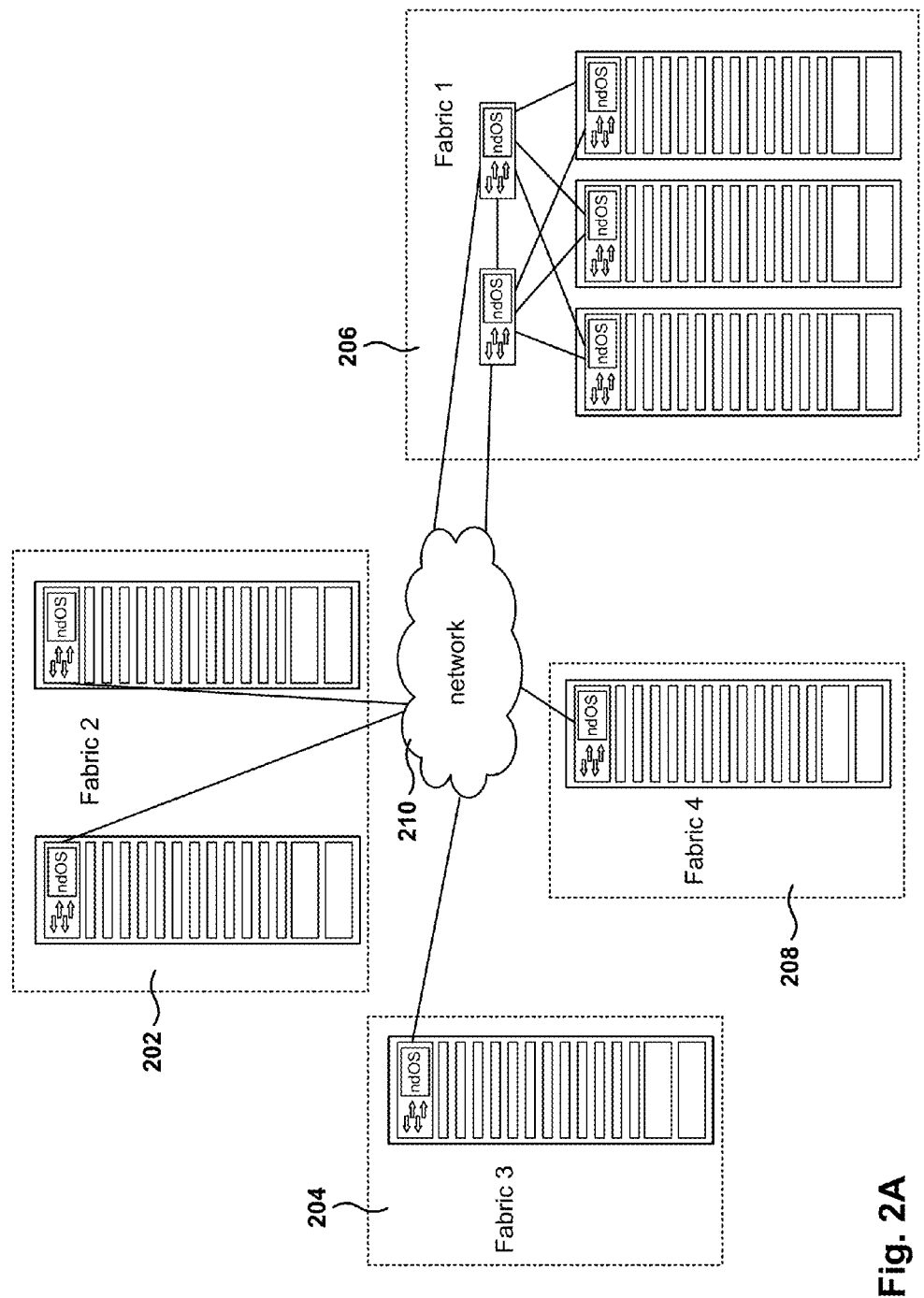
FIGS. 2A-2C illustrate the connection of multiple fabrics using tunnels, according to one embodiment.
Figure 2B:
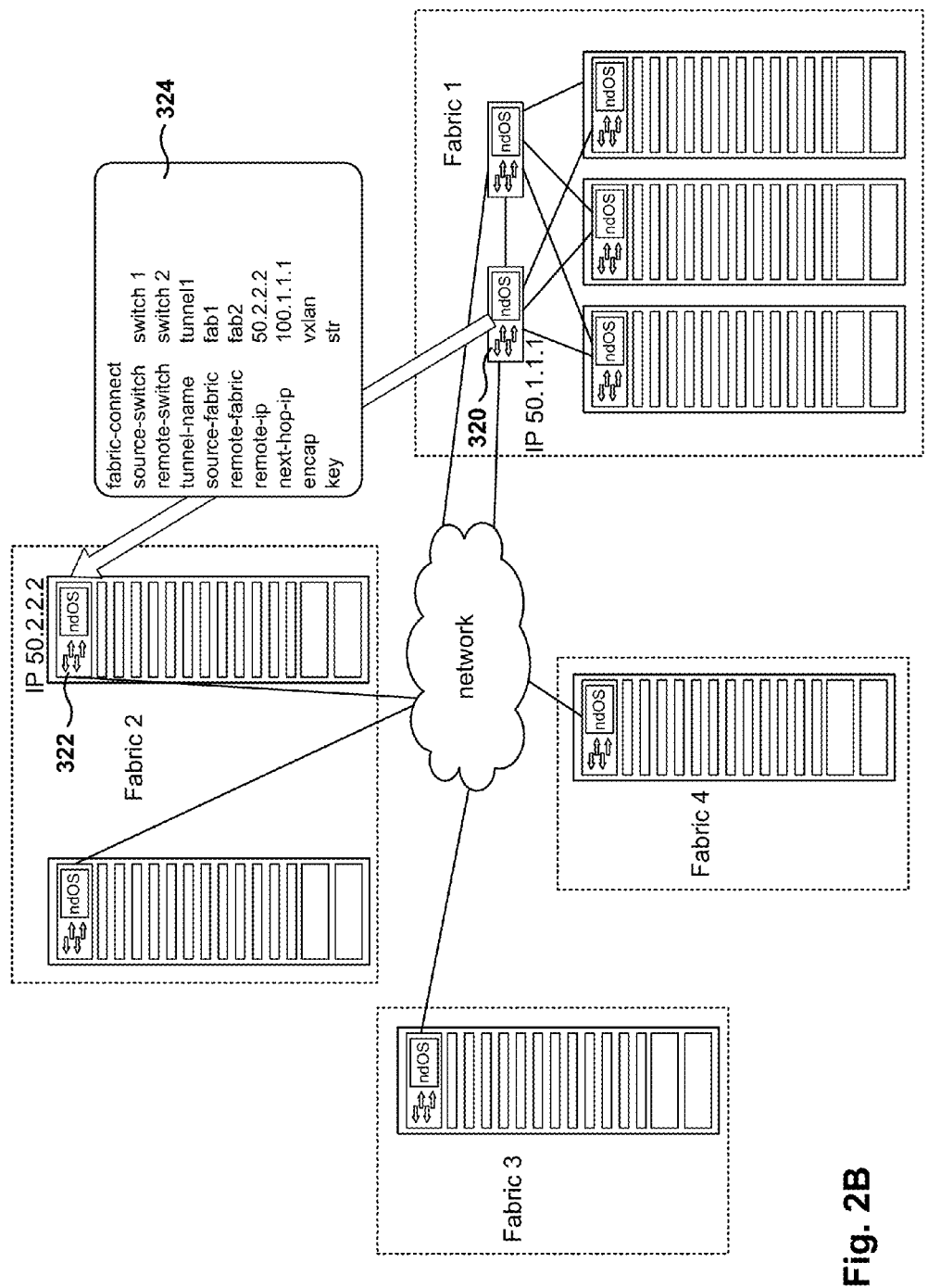
Figure 2C:
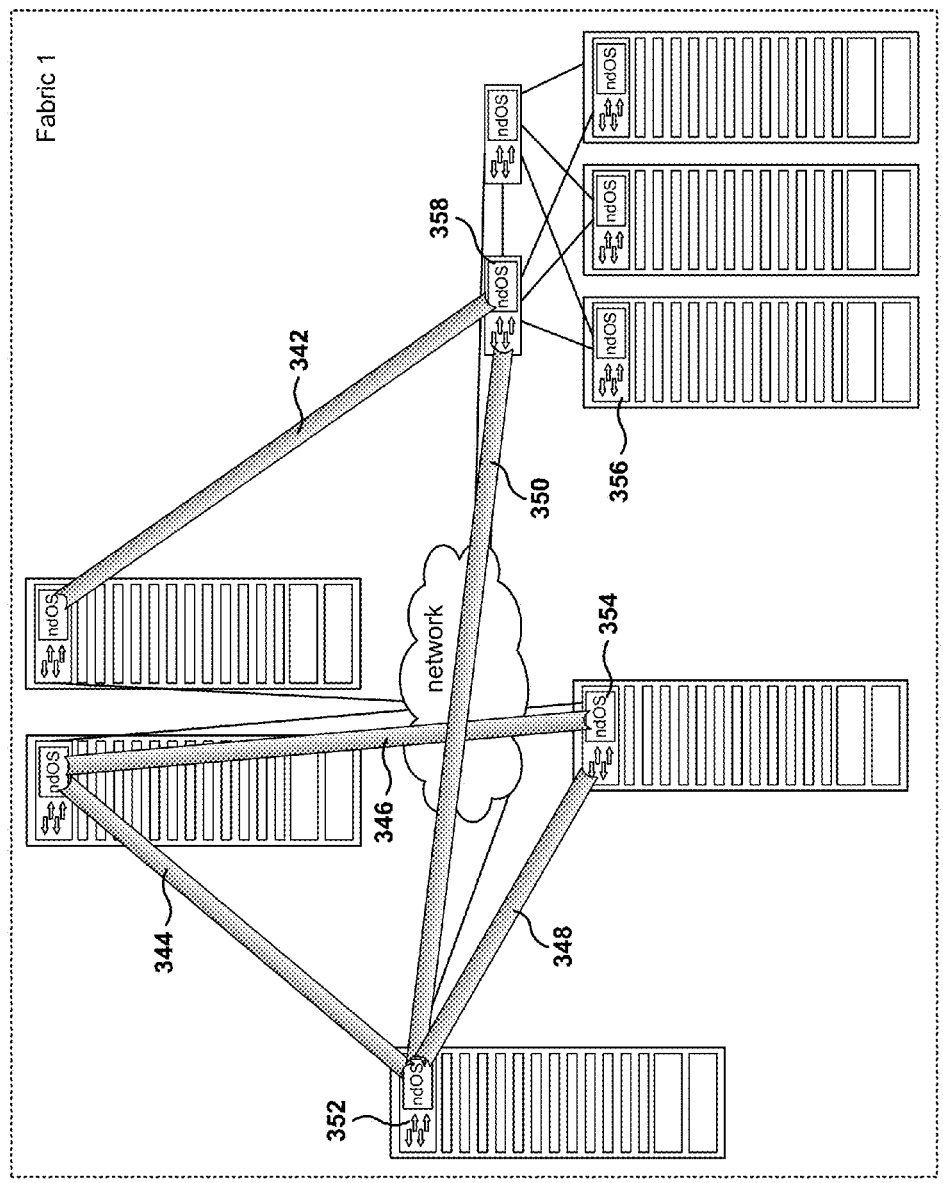

FIGS. 2A-2C illustrate the connection of multiple fabrics using tunnels, according to one embodiment. FIG. 2A illustrates a sample network with 4 fabrics (202, 204, 206, 208) interconnected over an IP network 210. The fabrics are also referred to herein as clusters or pods. A plurality of machines in physical racks can map onto a set of virtual networks that carve out portions of a single massive logical switch constructed out of the network fabric.

Each instance of the ndOS also communicates with other ndOS switches to keep a global state of flows, services, and virtual networks in the fabric. Layer 2 and layer 3 tables, flow data, and ndOS internal state is synchronized across the fabric. NdOS switches keep a global view of the fabric state. The state includes topology, switching, routing, and flow information. ARP, VXLAN based ARP, and other broadcast traffic is processed in software. NdOS identifies hosts, virtual machines, or mobile devices as a virtual port (denoted by a vport structure). A vport is uniquely indexed on combination of MAC address, VLAN, and VXLAN identifiers. A secondary index on IP address, VLAN, and VXLAN enables lookup based on IP address. A vport keeps track of the switch and port a device is directly connected to along with optional security policy and QoS policy. The vport is replicated across switches in the fabric. The vport also contains information that allows each switch to make the local switching decision and program the switch chip. This information includes whether the device is reachable by layer 2 or via a layer 3 tunnel. If the device is reachable via layer 2 the corresponding switch port is stored, and if the device is reachable via a layer 3 tunnel the corresponding tunnel id is stored. Resource and congestion management policies on individual switches and line cards ensure that each application flow, service, or virtual network benefit across the fabric and not just within individual switches.

The ndOS layer-2 fabric appears as one huge logical switch that can be managed in whole (e.g., using ndOS controllers in the different ndOS switches). The network management platform can create virtual networks that span the entire fabric, clusters, etc. Each cluster gets its own cluster manager in the form of a virtual machine that has privileges to perform cluster related operations. For instance, cluster managers can create virtual networks whose scope is local to a switch within the cluster. Alternatively, the scope may be across all members of the clusters. The cluster manager can also control the resources within the cluster. In one embodiment, each virtual network gets its own virtual network manager in the form of virtual machines that are hosted on one of the ndOS switches.

In one embodiment, the ndOS is managed via a graphical user interface, or a text driven interface, or computer generated API calls, etc. For example, an administrator may request from the network management platform 130 a certain number of IP addresses, a certain network configuration with switches and routers, non-redundant IP address, etc.

FIG. 2A is an exemplary hierarchy of switches, where a plurality of servers in each of the racks are connected to top-of-the-rack (TOR) switches (also referred to as leaf switches) to spine switches, which are switches coupled to TOR switches. It is noted that multiple paths in the connections are included for redundancy and multiple uplinks in one or more of the switches, but redundant connections are not required to implement embodiments presented herein.

In some data centers today, servers are being configured to do tunneling between servers, in order to create distributed virtual networks. The server-to-server tunnels allow a large set of machines to work as one virtualization pool within which VMs can migrate freely. In addition, in a large public cloud which may have thousands of tenants, the number of VLANs (4 k) becomes a limitation and with VXLAN a larger number of tenants (16M) can be supported.

However, operating server-two-server tunnels is usually complicated, often requiring orchestration software to allow network administrators to handle the complexity of having multiple servers with multiple tunnels and multiple virtual networks. The implementation of server-to-server tunnels introduces new issues:

1. Servers have been designed for over 20 years to run with TCP/IP over Ethernet-based VNICs. Tunnels are not native to any kernel and are typically an add-on feature which doesn't perform or scale well.

2. The NIC vendors and OS engineers have done more than 20 years of optimization to support TCP/IP over Ethernet. NIC optimizations include virtual switching offload, checksum offload for TCP/UDP, Large Segment Receive, and Transmit Offload. Together, these features provide tremendous performance and scaling benefits by offering stateless offload. Server tunnels are software-only constructs that disable these optimizations including any virtual switching offload.

3. Server-to-server tunnels introduce complexity into servers and applications. Without tunnels, an administrator can connect a couple of servers together with a switch, install a Linux distro and start communicating. Server-to-server tunnels depend on tunnel orchestration software, and without the orchestration software even basic communications don't work.

4. Server-to-server tunnels make the network and applications blind to what is really happening. The discovery phase is dependent on multicast which is unreliable and not implemented on many switches. Furthermore, the entire ecosystem of security and monitoring applications is blind to what is happening inside tunnels.

5. The default MTU hasn't changed from 1500 bytes while network speeds have gone up from 100 Mbps to 10/40 Gbps in the last 10 years. Sacrificing another 100 odd bytes for encapsulation headers adds more overhead to data transfers.

6. Server-to-server tunneling typically implies that each rack is a separate layer 3 domain that needs to be connected with higher end routers to scale. Managing layer 3 multipath with high-end routers adds significant capital and operational expenses to a data center.

FIG. 2B illustrates the connection of two fabrics, according to one embodiment. In one embodiment, an administrator has issued a configuration command to connect Fabric 1 and Fabric 2. Using ndOS management capabilities, the management software initializes the connection by instructing ndOS in switch 320 to send a fabric-connect request to ndOS in switch 322 in Fabric 2.

The fabric-connect message is for joining 2 pods into the same fabric. In one embodiment, the fabric-connect request includes one or more of the following parameters: source switch identification (switch 1), remote or destination switch identification (switch 2), the name of the source-fabric (fab1), the name of the remote-fabric (fab2), tunnel name (tunnel1), the IP address of the source switch (not shown), the IP address of the remote switch (50.2.2.2), the router IP address (e.g., next-hop-ip 100.1.1.1), encapsulation protocol (e.g., VXLAN), or encryption key.

In one embodiment, when the fabrics are connected, the resulting connected fabric is considered one distributed fabric. In one embodiment, the name of the new fabric is equal to the name of one of the previously existing fabrics. For example, when joining fabric 1 and fabric 2, the result will be a larger fabric 1, where the ndOS switches in fabric 2 will change the fabric name to fabric 1, so all the switches refer to the same fabric (fabric 1). In another embodiment, the new fabric may have the name of fabric 2, or a new name may be created, such as fabric 5.

In another embodiment, the fabrics may keep their original name, although tables are updated in each of the switches to identify that the fabrics may be part of one or larger interconnected logical fabric.

The result of connecting the two fabrics is a seamless layer 2 domain that encompasses multiple sites, where some of these sites are not directly interconnected over layer 2 but are connected over layer 3 connections. Switches 320 and 322 are connected to each other to establish layer 2 over layer 3 connectivity using VXLAN based tunnels. When packets are transmitted from one side to the other side through the tunnel, the actual encapsulation and decapsulation happen in hardware at line rates.

Although embodiments presented herein are described with reference to the VXLAN protocol, any other tunneling protocol may be utilized to transfer packets over the layer 3 connection between the two switches.

VXLAN was designed to allow administrators to interconnect data centers and treat them as one layer 2 domain. Switches have hardware offload capabilities, but servers do not. The switches can do encapsulation and decapsulation in hardware, but servers do not usually have that capability. By enabling the switches to do the tunneling, two things are achieved: tunneling processing is done primarily in hardware, and transmission line rates can be achieved. Additionally, the management is centralized and utilizes the existing switch management program that administrators are familiar with.

One of VXLAN advantage is to let administrators expand the level 2 domain to different buildings, different cities, different countries, different data centers, etc. In one example, an administrator may have the problem that is not possible to have a large layer 2 network because of scaling issues, loop issues, etc., and there may be several labs within one company, which could be managed as a single pod, but it is not possible because there is a layer 3 network in between that is managed by an outside firm or a network manager, and the administrator has no control of the layer 3 network.

FIG. 2C illustrates a distributed multi-site layer 2 network, according to one embodiment. FIG. 2C shows the network of FIG. 2A after tunnels 342, 344, 346, 348, and 350 have been created to connect the different sites. The result is one encompassing Fabric 1 for all the ndOS switches.

It is noted that, it is not necessary to have complete site-to-site tunnel connectivity because the ndOS switches are able to store and forward layer 2 packets to other ndOS switches. For example, switch 354 can send a layer 2 packet to switch 356 by sending the packet to switch 352 through tunnel 348. Switch 352 then forwards the packet to switch 356 via tunnel 350. Switch 358 then forwards the packet to switch 356.

Further, there could be more than one tunnel created between two sites, either between the same switches or between different switches in each of the sites. Any switch from each site can be doing the tunneling. It could be a TOR switch or a rack switch.

In some embodiments, when there are multiple customers using the same infrastructure, separate tunnels are created for each customer in order to provide custom-specific services, such as QOS, SLAs, network policies, etc.

After completing the fabric connect, any ndOS switch will have a switching table that reflects every server in the layer 2 network, and how each server is connected to each switch. From each switch there is a global view of the entire topology, and every layer 2 state.

Some of the fabric protocols are encrypted by keys, so key sharing is an important part of the fabric. If having the same fabric extent in multiple sites is allowed, then key sharing becomes simple. For example, when a fabric-connect request is performed, the name of one fabric and the keys from the one fabric are provided. If the switch making that fabric-connect requests doesn't know the key of the other switch, then the connection will not be possible. However, after the fabrics are connected, key coordinating is straightforward under the new paradigm with a single fabric.

As discussed above, multiple tunnels may exist between different switches, which increases tunneling capacity between the two sites. Load balancing can be done when redundant tunnels are available. Also, the number of hardware entries is increased to speed up tunneling operations.

Advantages of having switch-to-switch tunnels include not requiring orchestration software in the server and network devices; the ability to have multiple types of servers in the network that can communicate with each other without requiring special configuration or software; and a transparent multi-site network to the servers, which need not to know about the network complexity underneath the layer 2 network. From the point of view of the server, the server is connected to other servers in the same layer 2 network. Migration of VMs between servers is easy and straightforward.

FIG. 3 illustrates a switch connectivity table, according to one embodiment. As discussed above, ndOS is a distributed operating system that uses the layer 2 hardware table as a cache while the fabric-wide switching table is kept in software. Some switches keep the switching table indexed on MAC address and VLAN id along with the actual port association.

However, the ndOS switching table is built based on MAC address and VLAN id as the index and optionally with VXLAN also in the index. For each entry, switch id, port and policies are stored, as discussed in more detail below with reference to FIG. 5B. In ndOS, a layer 2 entry is called a vport.

FIG. 3 illustrates part of the global switch-to-switch connectivity table. Each entry includes the name of a source switch and port, the IP address and name (hostname) of the remote switch with remote port, and some status flags regarding the connection. There is fabric-level visibility, because the switches know how each switch is connected to each other.

When a VM issues an ARP for the first time, the nearest switch makes the switch and port association with the MAC address and VLAN of the VM. Since ndOS doesn't use broadcast on fabric links, the association is sent as a fabric message over TCP to each node in the fabric including nodes in remote pods. As a result the VM issuing the ARP is now registered across all switches in the connected fabric. The vport information is automatically created and any specified vport policy is enforced before switching tables are updated.

Therefore, broadcast and ARP packets are sent to other ndOS switches, that are not on the same layer 2 network, other over TCP/IP.

Similarly, if the host or VM for which the ARP was issued is not known, each switch sends the ARP to all its non-fabric ports until an ARP response is obtained, which is also registered in the fabric-wide switching table. NdOS employs LLDP, multicast, config, and other discovery methods to determine the overall connectivity graph.

Figure 4A:
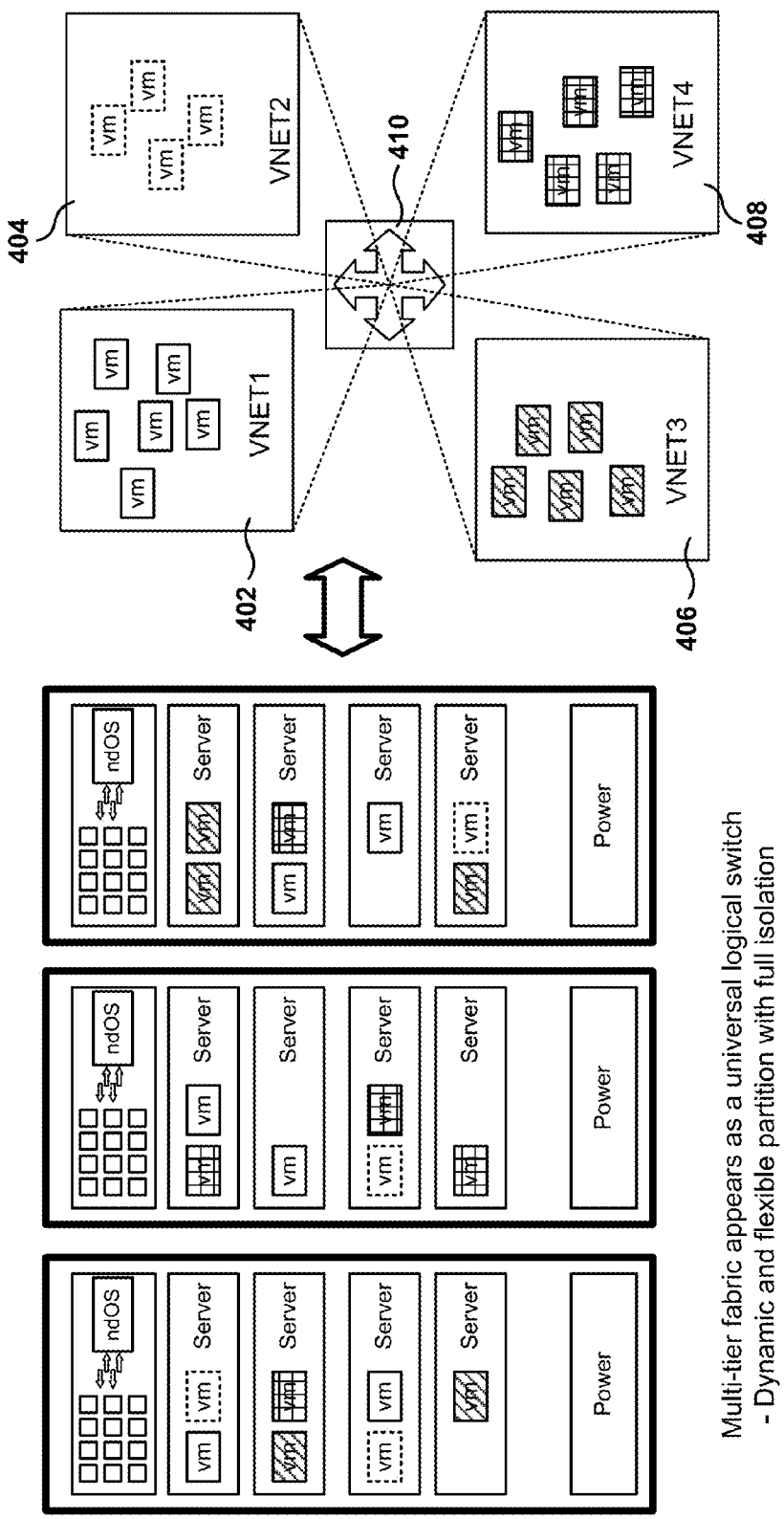
FIG. 4A illustrates a multitier fabric architecture, according to one embodiment.

FIG. 4A illustrates a multitier fabric architecture, according to one embodiment. The ndOS provides for the creation of different types of Virtual Networks 402, 404, 406, 408 (VNs, or vNets) and the assignment of resources and policies to the virtual networks, in one embodiment. In some sense, a vNet is not the same as an IEEE 802.1q VLAN, but instead, the 802.1q VLAN tag is just one of the possible attributes of the ndOS virtual network. The vNet is a collection of Virtual Machines, identified, for example, by their one or more MAC addresses, IP addresses, physical ports, etc., and has network attributes like VLAN tag, QoS labels, etc., associated therewith. In addition, the vNet also defines network resources like bandwidth guarantees, limits, latency ranges, queues, isolation semantics (in the form of virtual output queues, ingress and egress queues, etc.), number and performance and resource of virtual network services, etc. The scope of a vNet can be restricted to an individual switch (referred to as a local vNet) in the fabric, or to a cluster of switches (referred to as a cluster vNet) in the fabric, or to the entire fabric (global vNet).

In case where the host management is done by separate management software, ndOS provides APIs for external clients and agents to query the vNet information and its scope. Further, when the external agent or host management software wants to migrate a VM, the agent or host can query any ndOS instance to get a list of physical hosts which are allowed to host the virtual machine based on the scope of the vNet.

The ndOS extends the reach of the programmable layer 2 fabric when the hosts have virtualization-enabled network interface controller (NICs). Many modern NICs have some kind of virtualization support, for example built in the form of SR-IOV (Single root I/O Virtualization), an IEEE standard. This allows individual VMs to obtain part of the NIC resources, and the NIC itself appears directly mapped into the virtual machine. In one embodiment, the VM is directly able to communicate on the wire without its packets going through the hypervisor. This is good for performance but causes issues related to the informant of ACLs and bandwidth allotments. Even if a network interface card (NIC) provides a mechanism for ACL and bandwidth enforcements, the host administrator has to manually configure this parameters for the VM on the host.

Often times, a collection of VMs on different hosts belong to the same virtual network and need similar configuration. If the administrator has to configure each VM manually on each host, this configuration process is prone to human error. In addition, the VM cannot migrate dynamically because the administrator has to manually configure the same policy on the target host before allowing the VM to migrate. As shown in FIG. 4A, by allowing the ndOS on the switch to control the NIC on the host (either via a dedicated control port, hypervisor APIs or an ndOS agent running on the hypervisor), ndOS can automatically configure the ACL and any bandwidth limits/guarantees on the NIC on the target host based on the overall policies specified for the vNet. This allows the VMs to dynamically migrate without any violation of SLA or security policies.

In addition to managing ACL and bandwidth guarantees and limits on a per-VM basis on individual hosts, ndOS can automatically configure priority based flow control (IEEE 802.1 Qbb); Enhanced Transmission Selection (IEEE 802.1 Qaz); Edge Virtual Bridging (802.1 Qbg); Layer 2 Congestion Notification (802.1 Qau), etc., for individual VMs based on the overall policies specified for the vNet or by the vNet administrator. For instance, the fabric or cluster administrator may specify that all VM-to-VM communication needs to be accounted on the switch, which would result in ndOS configuring each host NIC to disable VM switching, and instead forward all packets to the first hop switch. In another instance, ndOS would configure any ACL specified for the vNet on all hosts that have a member VM for that particular vNet. The vNet administrator may be given privileges to ask ndOS to assign Emergency Telecommunications Service (ETS) labels to different traffic types for its member VMs in which case ndOS will configure the NICs on all hosts that support a VM belonging to the particular vNet. As the VMs migrate, the VNIC (and any VLAN) configuration is automatically instantiated on the target host and NIC by ndOS.

NdOS supports management of VMs on the hosts and can directly control the VM migration, including moving the necessary attributes like ACL, bandwidth guarantees/limits, etc. on the target system before migrating the VM. NdOS also supports a split management model where a host management system triggers the migration of VMs to a target system. When the VM sends out an ARP packet on the receiving host, ndOS automatically recognizes the MAC address and the fact that the host has not seen the MAC address on that particular switch port. NdOS then figures out the old host for the moving VM, which can be connected on another port or to another switch, and then moves the attributes corresponding to the VM from the NIC on the original host to the NIC on the target host. Since ndOS is a distributed operating system and all instances share all necessary information, ndOS can support VM migration across any switch in the LAYER 2 fabric as long as the VM is allowed, based on the policy given to the ndOS, to migrate to the target host based on the scope of the vNet.

In one embodiment, the ndOS switch also supports virtual network machine (VNM) appliances such as load balancers, firewalls, or customer specific appliances, as well as deep analytic appliances for compliance, Distributed Denial of Service (DDoS) monitoring, etc.

In summary, the multi-tier fabric appears as a universal logical switch, which means dynamic and flexible partition with full isolation, and instantiation of virtual appliances and virtual machines in the virtual networks created in the layer-2 fabric.

Figure 4B:
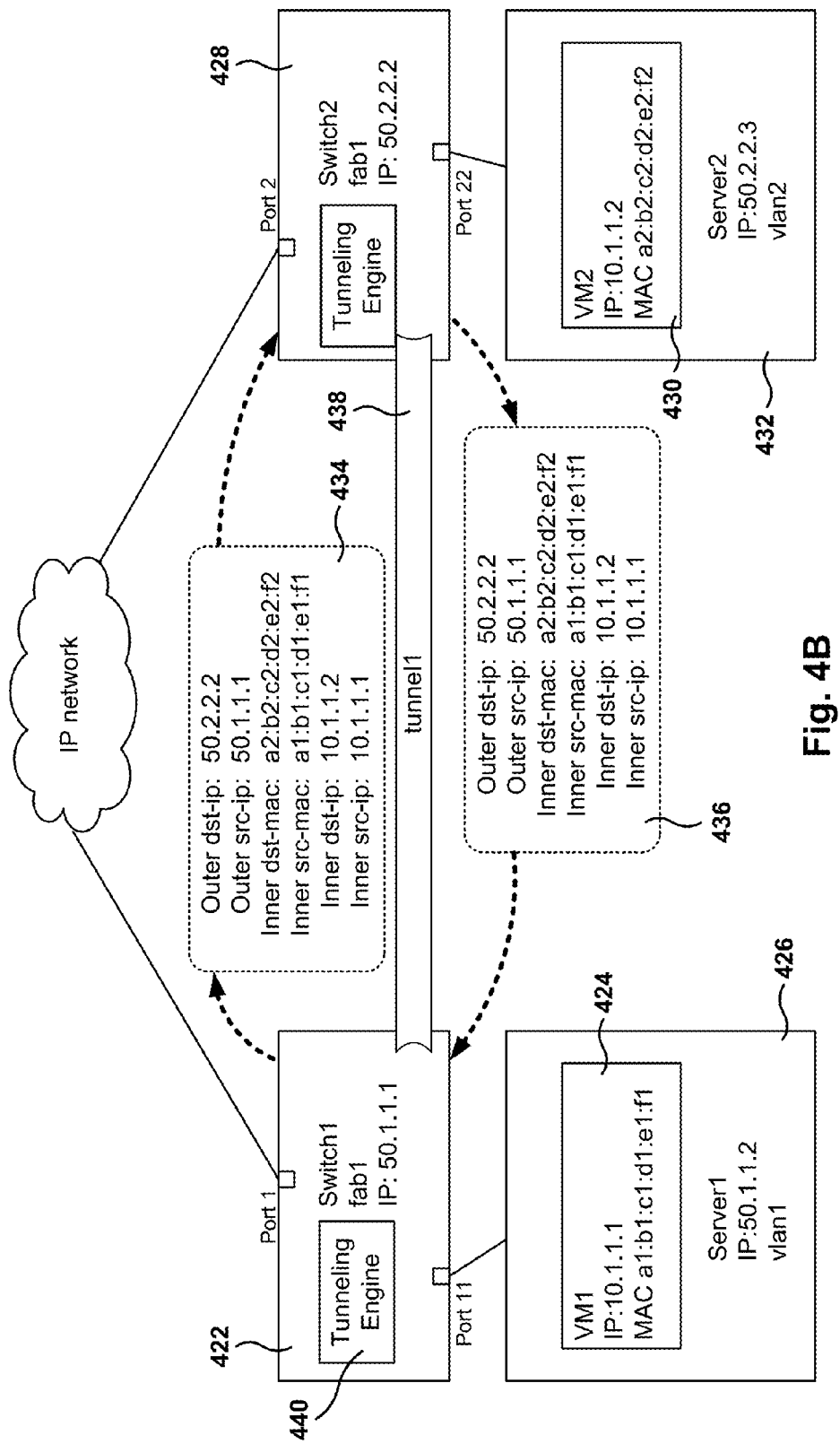
FIG. 4B illustrates the transmission of a network packet over a tunnel, according to one embodiment.

FIG. 4B illustrates the transmission of a network packet over a tunnel, according to one embodiment. In the exemplary embodiment of FIG. 4B, a first VM VM1 424 is sending a packet to a second VM VM2 430. VM1 has an IP address of 10.1.1.1 and a MAC address of a1:b1:c1:d1:e1:f1. VM1 is in server1 426 which has an IP address of 50.1.1.2 in virtual network vlan1. Server1 426 is connected to switch1 422 in port 11, and switch1 has an IP address of 50.1.1.1. Switch1 is connected in port 1 to a router to connect to the IP network.

VM2 has an IP address of 10.1.1.2 and a MAC address of a2:b2:c2:d2:e2:f2. VM2 is in server2 which has an IP address of 50.2.2.3 in virtual network vlan2. Server2 432 is connected to switch2 428 in port 22, and switch2 has an IP address of 50.2.2.2. Switch2 is connected in port 2 to a router to connect to the IP network.

It is noted that switch1 and switch2 have layer 3 connectivity through the IP network, but switch1 and switch2 do not have direct layer 2 connectivity. A tunnel tunnel1 438 has been established between switch1 and switch2 (e.g., as described above with reference to FIG. 2B).

When switch1 and switch2 discover the communication between VM1 and VM2, since the source MAC and destination MAC addresses are in different pods, the two switches holding the ends of the tunnel create a tunnel specific vflow to facilitate the encapsulation and the decapsulation.

Virtual Extensible Local Area Network (VXLAN) provides 16 million segments for layer 2 networks. VXLAN is an encapsulation/decapsulation method, which is usually referred to as a tunnel. VXLAN encapsulates the original Ethernet packet payload into UDP packets for transit across an IP network. The encapsulation adds about 50 bytes to the header. Virtual Network IDs (VNIDs) are vlxan segment identifiers. Broadcasts, and multicasts are also encapsulated in to vlxan. Virtual Tunnel End Points (VTEPs) are the end points that do the encapsulation and decapsulation (e.g., switch1 and switch2). VXLAN packets include an outer MAC header, and outer IP header, a UDP header, a VXLAN header and the original packet that is to be sent through the tunnel.

When VM1 sends a packet 434 to VM2, switch1 detects that the remote address is for VM2 which is logically connected to switch2. The tunneling engine module 440 in switch1 then encapsulates the packet into a VXLAN packet 334, which has the outer destination IP address as 15.2.2.2 (switch2 IP address), and outer source IP of switch1, and inner destination MAC address of VM2, a source MAC address of VM1, and inner destination IP of VM2, and an inner's source IP of VM1. When switch 2 receives the packet, the tunneling engine module in switch2 decapsulates the packet and delivers the original payload to VM2 through server2.

In the other direction, the communication from VM2 to VM1 436 through tunnel1 is the same, except that the source and destination addresses are reversed.

When establishing the connection between VMs, when an ndOS switch sees an ARP packet coming from one VM trying to go to another VM, and the VMs have IP addresses in the same subnet, the switch determines that the VMs belong in the same layer 2 domain. The switch knows that the other VM is reachable through a tunnel, so the switch responds to the VM so the VM sends packets for the other VM through the switch, which will tunnel to the remote switch.

Since switch1 cannot send the ARP to switch 2 over layer 2, but switch 1 knows that there is layer 3 connectivity, switch1 forwards the ARP packet over the layer 3 connection to switch 2 with a special tag, indicating that the ARP comes from VM1 in port 11. That allows switch 2 to learn where VM 1 is located (switch 1, port 11).

Because of the tunneling, ndOS disables switch chip hardware based MAC learning, flood on miss and all broadcasts on fabric links (the fabric communication is over TCP/IP). Additionally, all ARP and layer 2 miss packets (e.g., MAC miss packets) are sent to ndOS via a PCIe interface (as described in more detail with reference to FIG. 9).

The broadcast messages (including ARP and layer 2 miss) are sent to host port as normal but encapsulated over TCP/IP and send to other switches in the Fabric. On receiving such messages, the receiving switch updates its fabric-wide switching table in software and updates its hardware cache as necessary.

Figure 5A:
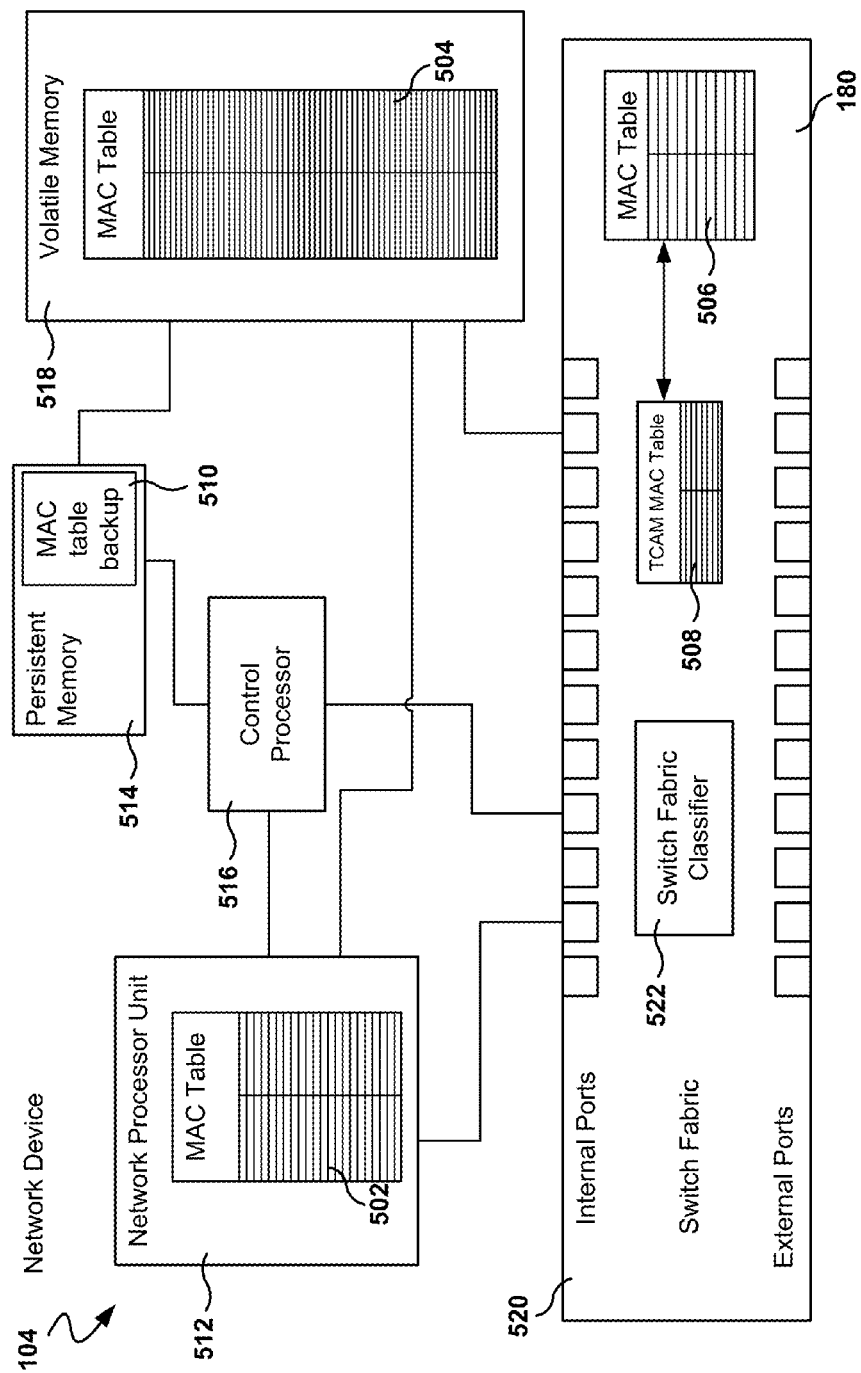
FIG. 5A illustrates a multilevel distributed Media Access Control (MAC) table architecture, according to one or more embodiments.

FIG. 5A illustrates a multilevel distributed Media Access Control (MAC) table architecture, according to one or more embodiments. As discussed below in more detail with reference to FIG. 9, incoming packets in the switch 104 may be routed through the switch fabric, the packet processor, or the processor. In one embodiment, each of these components keep its own MAC address table, which holds information regarding switching packets based on their MAC address. However, the sizes of the tables may vary considerably, as the amount of resources available for storage varies.

FIG. 5A includes a switch fabric with two levels of MAC tables, according to one embodiment. The switch fabric includes two levels of MAC tables, a TCAM MAC table 508, and a RAM MAC table 506. In one embodiment, the switch fabric includes logic for keeping addresses in the TCAM table or in regular non-volatile memory. In general, MAC addresses associated with heavy network traffic will be in the TCAM table, while other addresses are kept in the MAC table 506.

The packet processor usually has a larger amount of memory and also keeps a MAC address table 502, and the packet processor keeps, in one embodiment, its MAC address table in RAM memory, which can have a size of gigabytes, allowing for a large number of entries in the processor MAC table 502.

A Content-Addressable Memory (CAM), also known as associative memory, associative storage, or associative array, is a type of computer memory where a computer program supplies a data word and the CAM searches its entire memory to see if that data word is stored anywhere therein. If the data word is found, the CAM returns a list of one or more storage addresses where the word was found, and in some architectures, it also returns the data word, or other data associated with the request. A Ternary CAM (TCAM) is a type of CAM that allows the use of "wildcards," a third matching state of "X" or "Don't Care," for one or more bits in the provided data word, thus adding flexibility to the search by using Boolean logic.

In one embodiment, a switching goal is to have packets switched as fast as possible, and having the hardware (e.g., the switch fabric) switch a majority of the packets. However, the tradeoff for having high speed is to use expensive CAM or TCAM tables having limited sizes. Typically, the TCAMs have a small size (e.g., 128K). However, in environments with virtual machines, there can be millions of MAC addresses on the network. In one embodiment, the ndOS programs the switch fabric so if there is a MAC address miss, the switch fabric lets ndOS determine how to switch the packet.

When a packet comes in with a MAC address absent from the switch-fabric MAC 506, the switch fabric must send the packet to the packet processor (e.g., NPU) or to the processor. In addition, a packet with the MAC address in MAC table 506, may also be forwarded to the packet processor or the processor according to classification rules. In one embodiment, there are three MAC tables in the ndOS switch, with three different sizes and different levels of performance.

In one embodiment, control processor 516 will take an action after a miss in the MAC table 506 (or any other MAC table), such as adding the MAC address of the miss to one of the MAC tables 506, 504, or 502. If a MAC address for a received packet is not in any of the MAC tables, the control processor 516 may initiate a discovery process to find the destination switch, or the egress port in the switch, for that address. In one embodiment, the ndOS system can switch the packet that caused the MAC address miss in one or more of the MAC tables, without making any updates to the MAC tables (e.g., the packet caused a miss in the switch fabric MAC table 506 but it was a hit in MAC table 502 of the NPU).

In one embodiment, ndOS does not allow the switch chip to learn MAC addresses in hardware. The hardware tables are just a cache of the ndOS tables with the least recently used entry replaced on a hardware miss. In one embodiment, when a host or VM issues an ARP request, the request always comes to ndOS. The same is true for ARP inside a VXLAN packet.

Upon receipt of an ARP request, ndOS running on the switch that receives the request looks up the source MAC, VLAN, and VXLAN of the ARP request in the fabric-wide vport table. If no entry exists, a new one is created and propagated to other switches in the fabric. If an entry exists but the sender IP address in the ARP request is different from the IP address stored in the vport, the vport and the IP address index are updated and the change is propagated to other switches in the fabric.

Further, ndOS looks up the target IP, VLAN, and VXLAN in the fabric wide vport table to see if an entry exists for the target of the ARP message. If ndOS finds a vport entry, for the target, NdOS provisions switching tables or VXLAN tunnels to enable communication between the source and the target and sends an ARP response to the source. If the source and the target are on the same physical layer 2 network, ndOS uses the fabric wide topology information to identify the switches in the path from the source to the target, and updates the hardware tables of each switch with the appropriate entries so that network traffic between the source and the target can be switched in hardware. If the source and target are on different physical layer 2 networks, ndOS uses the fabric protocol to work with the switch connected to the target device to ensure that an appropriate VXLAN tunnel exists, and installs flows on both switches to encapsulate traffic between the source and the target and send the traffic using the tunnel. The encapsulation and decapsulation is done in hardware by the switch chip.

If a vport for the target of an ARP message is not found in the fabric wide table, the ARP message is encapsulated and forwarded to other fabric nodes using the fabric protocol. Using the fabric protocol rather than directly sending the ARP on the network enables the ARP to reach switches in the fabric that are in separate layer 2 networks.

The ndOS switches receiving the encapsulated ARP send the ARP to non-fabric ports. If a device with the destination MAC/VLAN/VXLAN exists in the fabric, the device sends an ARP response. The switch that receives the ARP response creates a vport for the device and propagates the vport to the other switches in the fabric. When the switch that received the original ARP request receives the vport for the destination MAC/VLAN/VXLAN, the switch provisions the fabric for communication between the source and the target and sends an ARP response on the same port over which the ARP request arrived.

In one embodiment, multicast join requests are handled in software and any group creation is driven for global view of the fabric. If a switch has other NdOS switches as neighbors connected via tunnels, the multicast message is sent over the fabric protocol and the NdOS instances on the other side of tunnel also joins the group so any data messages can be sent to the remote site using the fabric protocol.

Each ndOS switch has a dedicated event queue for every other switch in the fabric. A fabric scope configuration change is propagated from the originating switch to other switches in parallel, so that for a small number of switches in the fabric adding additional switches to the fabric does not increase the time to perform a transaction.

It is noted that, in one embodiment, the MAC tables are independent and updates to each of the tables may be performed independently. In another embodiment, the control processor utilizes logic to manage the content of the MAC tables, acting as a multilevel memory with different caching options for storing MAC address information.

In addition, control processor 516 may utilize heuristic algorithms to manage the content of the different MAC tables. For example, a new address may be added to MAC table 506 after performing an operation to remove one of the current entries in the table. The control processor may utilize any method to clear entries, such as least recently used (LRU), less frequency of use, FIFO, etc.

In one embodiment, the same principles presented herein with reference to MAC tables, may be applied to other data structures in the switch, such as IP tables, routing tables, VM tables, virtual network tables, etc.

Further, the concept of multilevel MAC table management may be expanded to the level 2 fabric, with the ndOS managing the content of the MAC address tables across a plurality of ndOS switches. For example, a global MAC address table encompassing a plurality of devices may be partitioned, replicated, etc., across the plurality of devices.

It is noted that the embodiments illustrated in FIG. 5A are exemplary. Other embodiments may utilize different levels of MAC tables, omit one of the MAC tables, omit some of the elements (e.g., one embodiment may not include an NPU), etc. The embodiments illustrated in FIG. 5A 12A-12B should therefore not be interpreted to be exclusive or limiting, but rather exemplary or illustrative.

FIG. 5B is a MAC table entry, according to one or more embodiments. In one embodiment, the MAC table in the switch includes one or more of the following fields:

The MAC address,
A vlan identifier,
A VXLAN tag,
The destination switch that can deliver the packet to the MAC address,
Flag indicating if the packet should be sent to a port or through a tunnel,
Egress Port identifier for this MAC address at the destination switch,
Tunnel id
Policy pointer (pointer to the policy for this address, related to SLA, security, etc.)
Type of entry (dynamic or static),
Age of the entry,
Timestamp for the entry creation time,
Timestamp when this address was last used,
Frequency of use for this MAC address, etc.

In one embodiment, the MAC tables in the switch fabric or the NPU have a similar structure, but some of the fields may be omitted, or additional fields may be added.

In one embodiment, the table is indexed by MAC address and VLAN id, and optionally by VXLAN id if the VXLAN exists.

In basic switches, address tables are indexed by MAC address and VLAN. When a packet is received, the switch looks at the destination MAC plus the VLAN, and then switch decides which port to send it to. In ndOS switches, the switching tables work across the fabric and are shared with switches across the fabric. The address table is indexed by MAC address, VLAN id, and VXLAN id (if available), but the ndOS tables also keep the destination switch and port at the destination switch where the packet needs to go.

When an ARP for a VM is received, the ndOS switch looks up the destination using the fields in the index. If the entry is found, then the entry identifies the the final switch/port/vlan association along with an action, e.g., the switch is reachable only via a tunnel so the switch needs to create an encapsulation rule that puts the packet in the tunnel. In one embodiment, all future unicast packets to the destination will hit the encapsulation rule and reach the other side (this happens in hardware) but broadcast and multicast has to be processed in software and are sent to remote switches over fabric protocol using TCP/IP.

It is noted that the embodiment illustrated in FIG. 5B is exemplary. Other embodiments may utilize different fields, organize the fields in a different order, including fewer fields, etc. The embodiments illustrated in FIG. 5B should therefore not be interpreted to be exclusive or limiting, but rather exemplary or illustrative.

Figure 6:
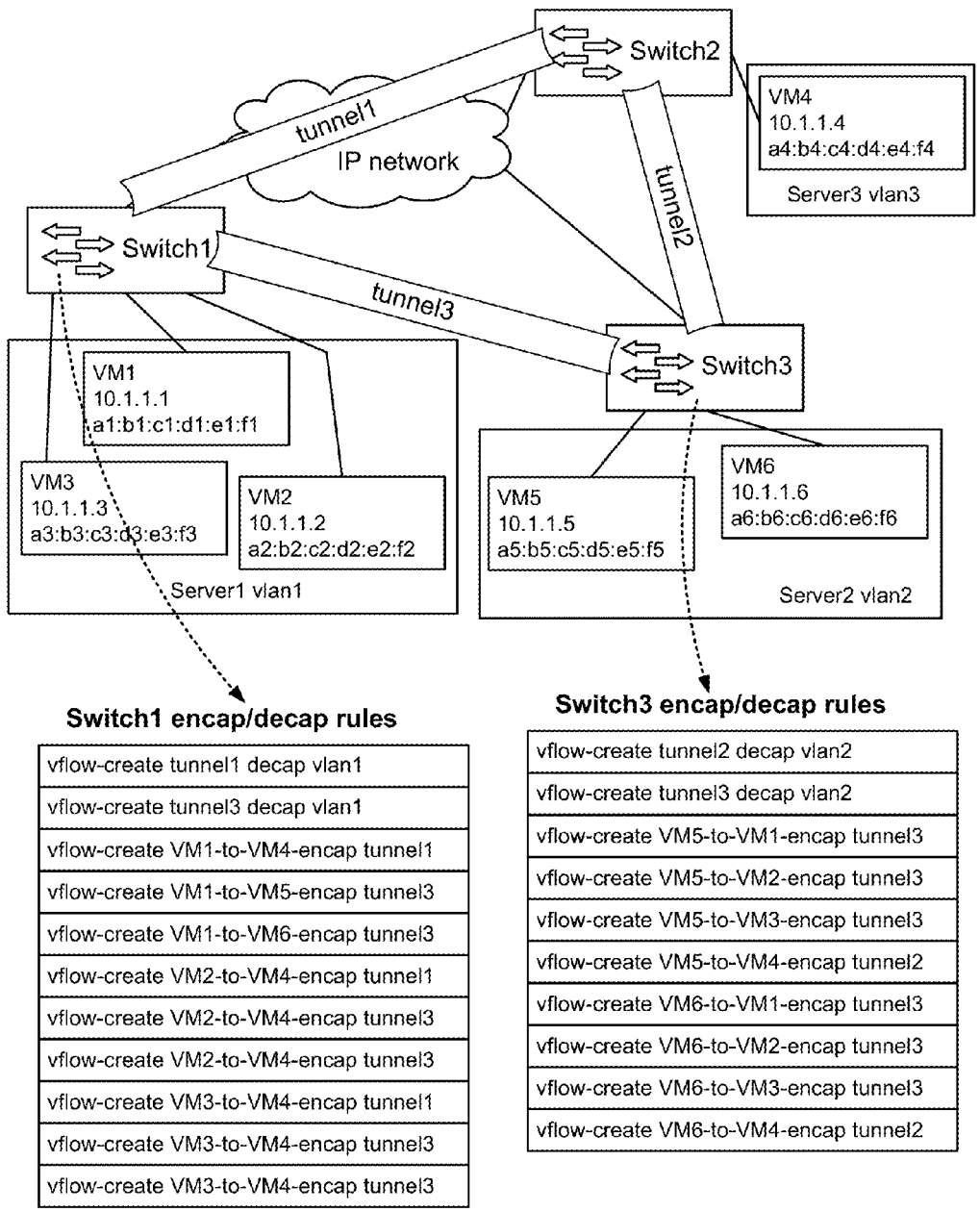
FIG. 6 illustrates the creation of encapsulation and decapsulation rules in a multi-site fiber architecture, according to one embodiment.

FIG. 6 illustrates the creation of encapsulation and decapsulation rules in a multi-site fiber architecture, according to one embodiment. In the network of FIG. 6, three switches are interconnected via tunnels. Switch1 is connected to switch2 via tunnel1, switch1 is connected to switch3 via tunnel3, and switch2 is connected to switch3 via tunnel2. The corresponding fabric-connect requests have been satisfied to create the three tunnels.

Server1 includes VM1, VM2, and VM3, and is connected to switch1. Further, switch2 is connected to server3 with VM4, and switch3 is connected to server2 with VMs VM5 and VM6. For description purposes, it is assumed that each VM is in communication with every other VM.

FIG. 6 illustrates the creation of encapsulation and decapsulation rules for switch1 and switch3. In one embodiment, a decapsulation rule is created for each tunnel configured at a switch. Further, an encapsulation rule is created for each VM-to-VM communication pair.

Therefore, switch1 has two decapsulation rules, one for tunnel1 and another one for tunnel3, because switch1 is connected via two tunnels. In one embodiment, the decapsulation rules are creating with the following command:

vflow-create name tunnel1-decap tunnel tunnel1 action decapsulation action-arg vlan1

Where vflow-create is the name of the command, tunnel1-decap is the name of the rule, tunnel1 is the name of the tunnel, the action is decapsulation, and the argument for the decapsulation action is vlan1. This rules means that anything coming out of this tunnel is to be decapsulated.

Similarly, the other decapsulation rule at switch1 is:

vflow-create name tunnel3-decap tunnel tunnel3 action decapsulation action-arg vlan1

An encapsulation rule for the communication from VM1 to VM4 is as follows:

vflow-create name VM1-to-VM4-encap dst-MAC a4:b4:c4:d4:e4:f4 action tunnel-packet action-arg tunnel1

Where vflow-create is the name of the command, VM1-to-VM4-encap is the name of the rule, the destination MAC address is a4:b4:c4:d4:e4:f4 (VM4's address), the action is to tunnel the packet, and the argument of the action is to tunnel through tunnel1. Therefore, the encapsulation is performed based on the destination MAC address.

In one embodiment, the tunnels are created on demand based on ARPs. At any given time, there could be 12000 to 24000 remote VMs active (depending on the switch chip). Some of the switch chips have additional BST tables which can accommodate MAC address based rules and can allow the hardware based rules to scale to 56000 entries, or even more.

Additional tunnels can be created between more pair of switches (one from each pod) to allow for additional hardware-based scaling. Instead of a single tunnel to carry all tunneled traffic, per-tenant tunnels can be created. Only VMs in the servers of that tenant (based on the VXLAN or some customer ID) will use the tunnel. This allows the enforcement of per-tenant SLA, policies and services.

The encapsulation's last decapsulation tables can be in the kernel or in user space. The rules are programmed into the actual switch CAM or TCAM so the tunnel encapsulation can happen in the hardware itself without any software overhead.

The tunnel protocol can be VXLAN, nvgre, or any other tunnel protocol that the switch chip supports in hardware. All switch-to-switch connectivity can be tunneled via fabric-connect allowing each switch to be in its own layer 3 domain.

If more tunnels are required than fit in the hardware flow tables, the hardware flow tables are used to store the flows for the most active tunnels and overflow encapsulation is handled in software.

As discussed above, the initial decapsulation rules are created by an administrator to connect two switches in remote sites. For example, the administrator may enter a command to connect a first switch to a second switch on a different site, including in the command the IP addresses, the tunneling protocol (e.g., VXLAN), the key to encrypt packets over the tunnel, etc.

Assuming that initially VM1 and VM4 where in the same server, and then VM4 migrates from one side to another site (e.g., from one server to another server), then the switches automatically detect the motion of VM4 and creates the encapsulation rule for VM to VM communication. Further, if the decapsulation rule for the tunnel has not yet been created, then the decapsulation rule is created.

After the motion, all the other ndOS switches are also informed of the migration. The advantage is that the VMs don't need to change their configuration (e.g., IP address), and the VMs don't need to know that they were moved.

It is noted that the embodiments illustrated in FIG. 6 are exemplary. Other embodiments may utilize different encapsulation/decapsulation syntax or rules. The embodiments illustrated in FIG. 6 should therefore not be interpreted to be exclusive or limiting, but rather exemplary or illustrative.

Figure 7A:
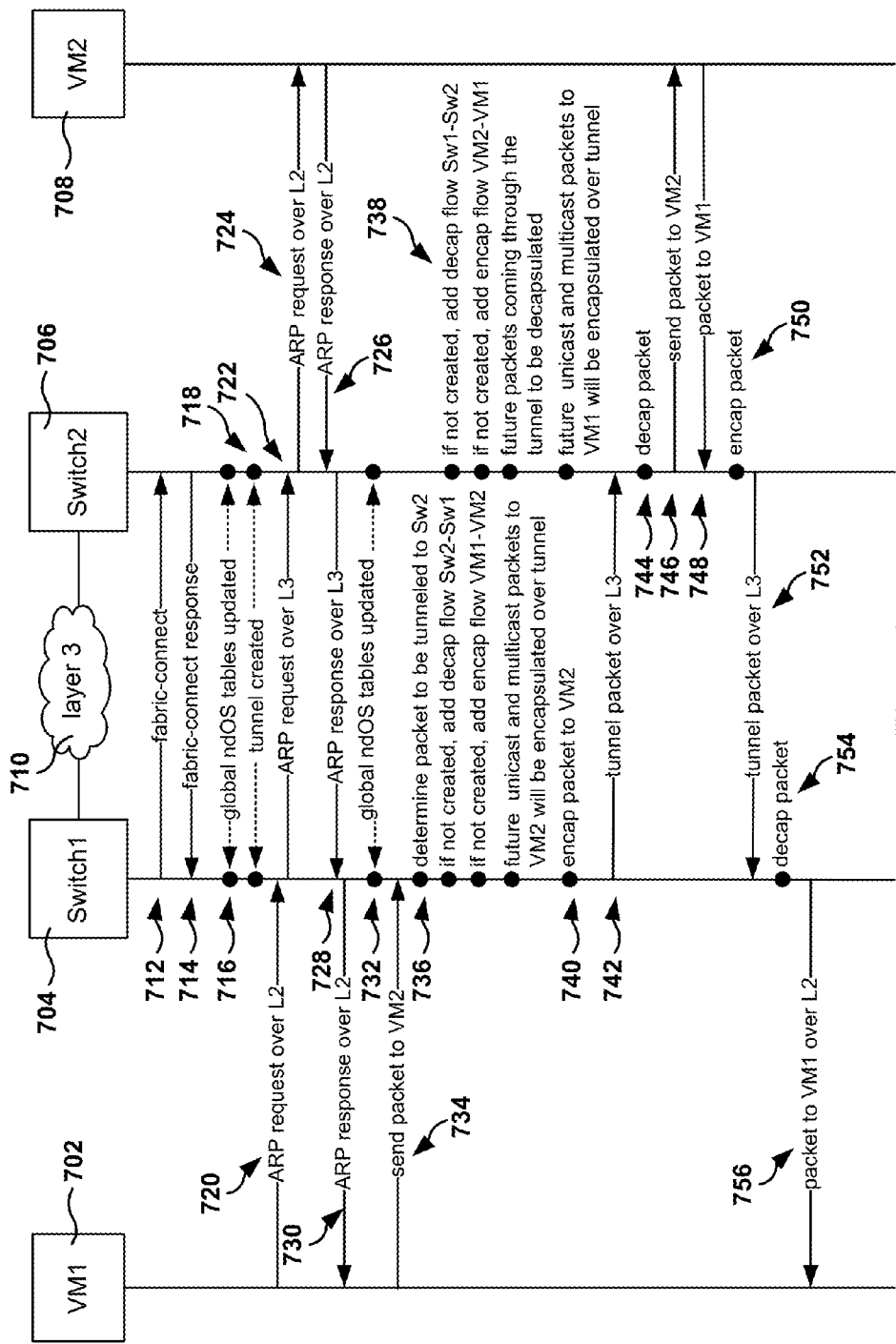
FIG. 7A illustrates interactions between ndOS switches related to tunneling packets, according to one embodiment.

FIG. 7A illustrates interactions between ndOS switches related to tunneling packets, according to one embodiment. VM1 702 is connected to switch1 704, which is connected to switch2 706 over a layer 3 connection 710, and VM2 708 is connected to switch2 706, as described in FIG. 4B. While the various operations in this chart are presented and described sequentially, one of ordinary skill will appreciate that some or all of the operations may be executed in a different order, be combined or omitted, or be executed in parallel.

In operation 712, switch1 sends a fabric-connect request to switch2, for example, in response to an administrator command to connect the two fabrics. Switch2 performs the required operations to connect the fabrics and sends a response 714 to switch1. After the fabric-connect operation, switch1 and switch2 are part of the same ndOS pool, which means that they share switch management tables, such as the MAC address table described with reference to FIG. 5B.

As a result of the connection of the two fabrics, the global ndOS tables are updated 716 in all the switches belonging to the ndOS pool. Further, a layer 3 tunnel is created 718 between switch1 and switch2.

When VM1 wants to communicate with VM2, VM1 sends an ARP request 720 over layer 2 to switch1. Since switch1 doesn't have MAC address information about VM2, switch1 sends the ARP request to other ndOS switches and may also send a broadcast on the local layer 2 network. Since switch2 is communicating with switch1 over a layer 3 connection, the ARP request is not sent as a broadcast, but rather as a unicast packet 722 to switch2.

When switch2 receives the ARP request, switch2 sends the ARP request 724 to nodes in its layer 2 network, including VM2. When VM2 receives the request, VM2 responds 726 to the ARP message with its information, such as VM2's MAC address.

Switch2 forwards the response 728 over the layer 3 back to switch1, which forwards the response 730 to VM1 over the layer 2 network. In operation 732, both switches update the global ndOS MAC table with the new information about VM2.

Since VM1 now has connection information for VM2, VM1 now sends a packet 734 to VM2, which is sent via switch1. Switch1 then determines 736 that the packet has to be sent through the tunnel to switch2 based on the MAC address information (as described above with reference to FIG. 5B). Additionally, if a flow for the tunnel between switch1 and switch2 has not been created yet, then a decapsulation flow rule between switch1 and switch2 is created (as described above with reference to FIG. 6). It is noted that the decapsulation flow rule between switch1 and switch2 only has to be created once.

Additionally, if an encapsulation flow has not been created from VM1 to VM2, the encapsulation flow rule is created. Future unicast and multicast packets sent from switch1 to VM2 will be encapsulated over the tunnel and sent as a unicast message. Similarly, switch2 also creates 738 the decapsulation and encapsulation rules if they don't exist yet.

Switch1 then encapsulates 740 the packet from VM1 using the encapsulation flow rule, and the packet is sent 742 over the layer 3 connection to switch2. Upon receipt by switch2, the packet is decapsulated 744 and then sent 746 to VM2 over a layer 2 connection.

The communication from VM2 to VM1 works in reverse, therefore, when VM2 sends a packet 748 to VM1, the packet is encapsulated 750 by switch2 because switch2 has the encapsulation rule of the flow from VM2 to VM1. Switch2 then sends 752 the encapsulated packet (because of the encapsulation rule of the flow from VM2 to VM1) over the tunnel in the layer 3 connection, and switch1 decapsulates the packet 754 before sending the packet 756 to VM1.

Figure 7B:
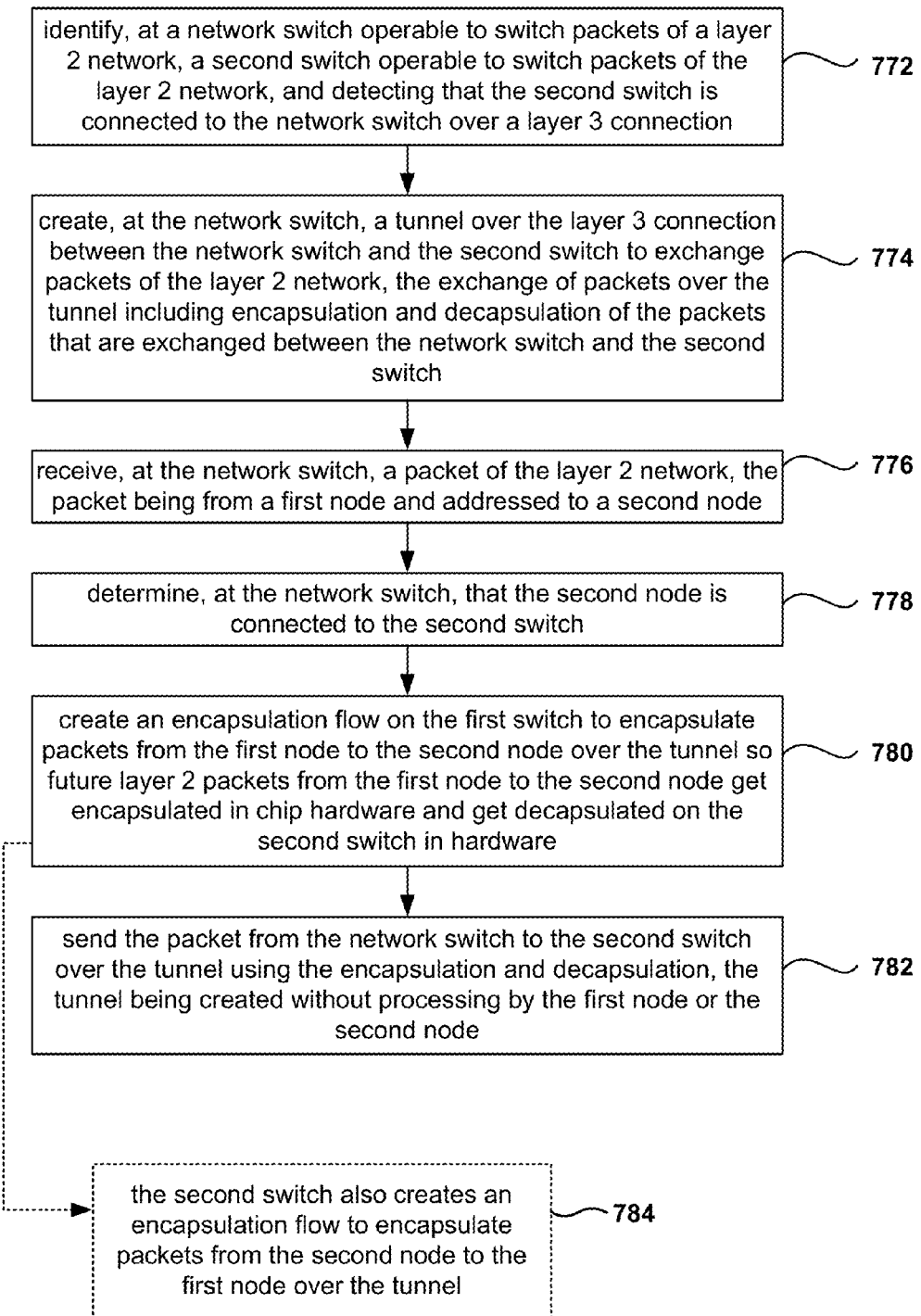
FIG. 7B is a flowchart of an algorithm for connecting fabrics, in accordance with one or more embodiments.

FIG. 7B is a flowchart of an algorithm for connecting fabrics, in accordance with one or more embodiments. While the various operations in this flowchart are presented and described sequentially, one of ordinary skill will appreciate that some or all of the operations may be executed in a different order, be combined or omitted, or be executed in parallel.

Operation 772 is for identifying, at a network switch operable to switch packets of a layer 2 network, a second switch operable to switch packets of the layer 2 network, the identifying including detecting that the second switch is connected to the network switch over a layer 3 connection. An administrator or orchestration engine for a NdOS switch can create a hardware tunnel between two switches to provide layer 2 encapsulation over layer 3. Since ndOS switches support encapsulation/decapsulation in hardware, ndOS allows for tunneling layer 2 over layer 3 using a switch chip as an offload engine. The ndOS flow programming capability and encapsulation/decapsulation offload allows two virtual machines on the same layer 2 domain but separated by a layer 3 domain to communicate at line rates without any performance penalties.

From operation 772, the method flows to operation 774, where a tunnel is created at the network switch, over the layer 3 connection between the network switch and the second switch to exchange packets of the layer 2 network. The exchange of packets over the tunnel includes encapsulation and decapsulation of the packets that are exchanged between the network switch and the second switch.

From operation 774, the method flows to operation 776 for receiving, at the network switch, a packet of the layer 2 network, the packet being from a first node and addressed to a second node. Additionally, from operation 776, the method flows to operation 778 where the network switch determines that the second node is connected to the second switch.

From operation 778, the method flows to operation 780 for creating an encapsulation flow on the first switch to encapsulate packets from the first node to the second node over the tunnel so future layer 2 packets from the first node to the second node get encapsulated in chip hardware and get decapsulated on the second switch in hardware. After the encapsulation flow is created, the packet is sent in operation 782 from the network switch to the second switch over the tunnel using the encapsulation and decapsulation. The tunnel is created without processing by the first node or the second node, i.e., the first node and the second node do not have to do any work to establish or use the tunnel, and the tunnel is, in one embodiment, transparent to the first node and the second.

Additionally, the second switch also create an encapsulation flow (operation 784), where packets from the second node to the first node are encapsulated over the tunnel. When the first switch receives the encapsulated packet from the second switch, the first switch decapsulates the packet before delivering it to the first node.

In one embodiment, the first node and the second node are VMs executing on a hypervisor on a server. However, the embodiments described herein for tunneling may be used for any type of network entities connected to the ndOS switches.

FIG. 8 is a table showing the results of testing VM-to-VM traffic under different configurations, according to one embodiment. To show the performance comparison between running server-to-server tunnels versus switch-to-switch tunnels, some test were performed under different configurations.

The basic network was the same as described in FIG. 4B. Two Linux servers were connected to their respective switches with a router separating the two switches.

In test 1, server 1 and its VM1 were configured with IP subnet1, and server2 and its VM2 with IP subnet2. A performance tool was used that measures the throughput when as much data as possible is being sent from one party to the other. The bandwidth for test 1 was 9.41 Gbps.

In test 2, server1 and VM1 have IPs on subnet1 and server2 and VM2 have IPs on subnet2. The performance test showed the VM overhead compared to test 1. The result was a bandwidth of 9 Gbps, with a 50% utilization of a CPU core on the receiver, and 20% of a CPU core on the sender.

In test 3, VM2 was configured with an IP address from subnet1 and a VXLAN tunnel was run on both servers, i.e., a server-to-server tunnel. The result shows the VXLAN overhead as compared to test 2. It shows a decrease on the bandwidth to 3 Gbps, with an 80% CPU utilization on a core on the receiver, and 60% on the sender. Therefore, the bandwidth is only one third because the servers are busy encapsulating, encrypting, decrypting, and decapsulating.

In test 4, a switch-to-switch tunnel was configured between the switches, without the server-to-server tunneling, as described with reference to FIG. 4B and the resulting bandwidth was 9.93 Gbps, which is almost the same as in test 1 for server-to-server performance.

Figure 9:
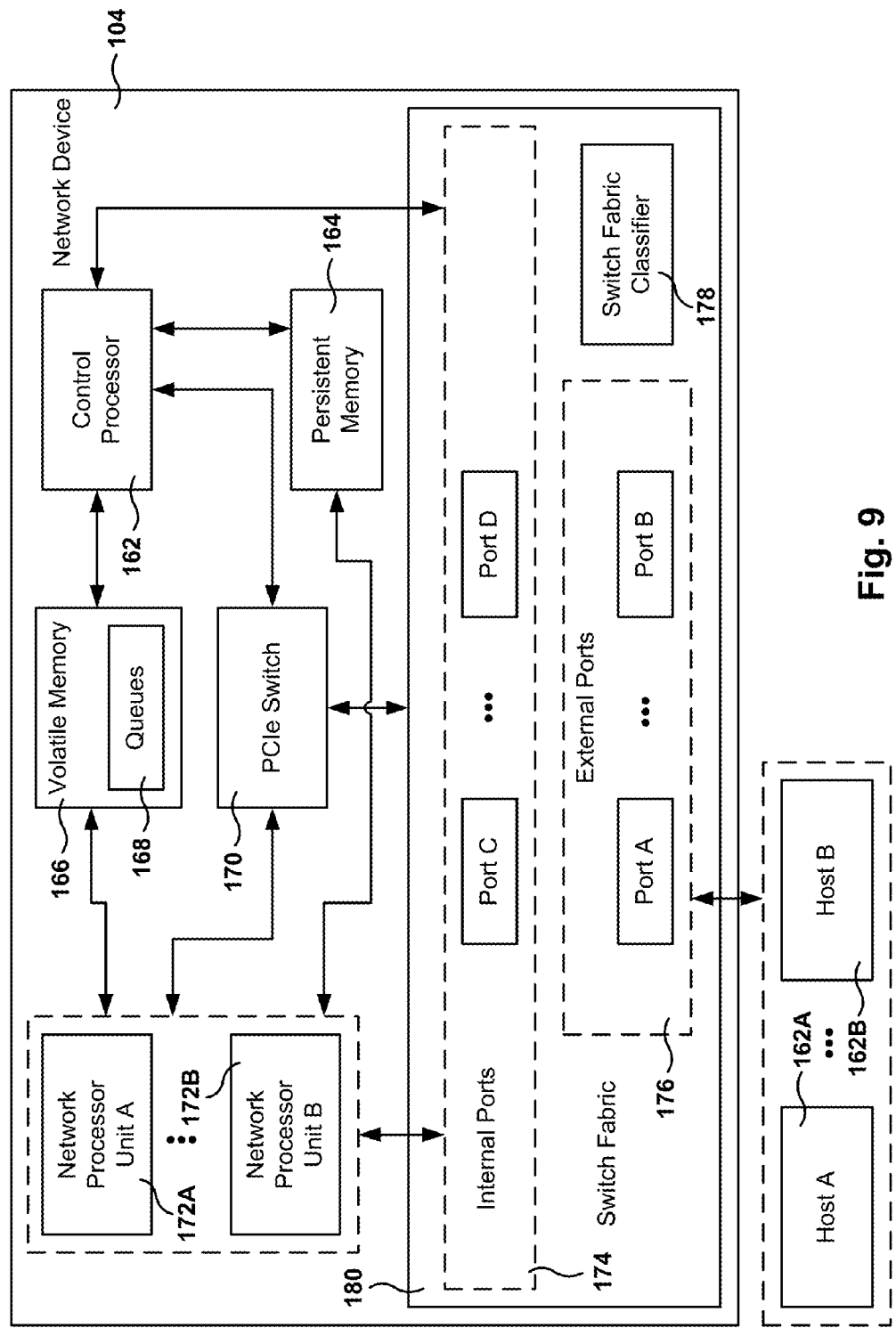
FIG. 9 shows a network device in accordance with one or more embodiments.

FIG. 9 shows a network device in accordance with one or more embodiments. In one or more embodiments, the network device 104 includes external ports 176, internal ports 174, a switch fabric classifier 178, one or more network processing units (NPUs) 172A-172B, also referred to herein as packet processors, a control processor 162, persistent memory 164, a Peripheral Component Interconnect Express (PCIe) switch 170, switch fabric 180 and volatile memory 166. The PCIe connection may be implemented over a copper connection, or an optical media connection, or any other type of media that supports PCIExpress.

In one embodiment, the network device 104 is any physical device in a network that includes functionality to receive packets from one network entity and send packets to another network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device (also referred to as hosts, see, e.g., 102A, 102B), virtual network appliances (e.g., virtual switch, virtual router), and physical network appliances (e.g., firewall appliance).

The network device 104 (or components therein) may be implemented using any combination of hardware, firmware, and/or software. With respect to the hardware, the network device may be implemented using any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof.

In one embodiment, the switch fabric 180 includes one or more internal ports 174, one or more external ports 176, and the switch fabric classifier 178. In one embodiment, the switch fabric classifier 178 may be implemented using an on-chip or off-chip Ternary Content Addressable Memory (TCAM) or other similar components. In one embodiment, the internal and external ports correspond to virtual or physical connection points. In one embodiment, the switch fabric may be implemented using packet switching, circuit switching, another type of switching, or any combination thereof. The external ports 176 are configured to receive packets from one or more hosts 162A-162B and to send packets to one or more hosts 162A-162B. While FIG. 9 shows the external ports connected only to hosts 162A-162B, the external ports 176 may be used to send and receive packets from any network entity.

In one embodiment, the internal ports 174 are configured to receive packets from the switch fabric 174 and to send the packets to the control processor 162 (or more specifically, the ndOS executing on the control processor) and/or to an NPU (172A, 172B). Further, the internal ports are configured to receive packets from the control processor 162 (or more specifically, the ndOS executing on the control processor) and the NPUs (172A, 172B).

In one embodiment, the control processor 162 is any processor configured to execute the binary for the ndOS. In one embodiment, the NPU is a specialized processor that includes functionality to processes packets. In one embodiment, the NPU may be implemented as any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. In one embodiment, the network device (100) may also include Field Programmable Gate Arrays (FPGAs) and/or Application Specific Integrated Circuits (ASICs) that are specifically programmed to process packets. In one embodiment, the network device may include FPGAs and/or ASICs instead of NPUs. In one embodiment, processing packets includes: (i) processing the packets in accordance with layer 2, layer 3 and/or layer 4 protocols (where all layers are defined in accordance with the OSI model), (ii) making a copy of the packet, (iii) analyzing (including decrypting and/or encrypting) the content of the header and/or payload in the packet, and/or (iv) modifying (including adding or removing) at least a portion of the header and/or payload in the packet.

In one embodiment, the switch fabric 180 is configured to: (i) send packets received from the internal ports 174 to the appropriate external ports 176 and (ii) send packets received from the external ports 176 to the appropriate internal ports 174.

In one embodiment, the switch fabric classifier 178 is configured to apply a classification rule to each packet received by the switch fabric to determine: (i) whether to send the received packet to an external port, (ii) whether to send the received packet to an internal port, and/or (iii) whether to send the received packet to the PCIe switch 170.

In one embodiment, the classification rule includes a classification criteria and an action. In one embodiment, the classification criteria specifies a media access control (MAC) address, an Internet Protocol (IP) address, a Transmission Control Protocol (TCP), user datagram protocol (UDP), an OSI layer 4 information related to a TCP ports, an IPSec security association (SA), a virtual local area network (VLAN) tag, a 802.1Q VLAN tag, or a 802.1Q-in-Q VLAN tag, or any combination thereof. In one embodiment, the action corresponds to an action to be performed when a packet satisfying the classification rule is identified. Examples of actions include, but are not limited to, (i) forward packet to the control processor (via a specific internal port or the PCIe switch), (ii) forward packet to an NPU (via a specific internal port or the PCIe switch), and (iii) send a copy of the packet to a specific external port, count the packet into one byte and packet counter or into a plurality of such counters based on further criteria such as packet size, latency, metadata such as physical ports for ingress or egress, etc., add meta data to any copied or forward packet such as timestamps, latency, physical ingress or egress path, etc.

In one embodiment, the switch fabric 180 is configured to communicate with the control processor 162 and/or the NPUs 172A-172B using a Peripheral Component Interconnect Express (PCIe). Those skilled in the art will appreciate the other hardware based switching frameworks/mechanisms may be used in place of (or in addition to) PCIe.

In one embodiment, the persistent memory 164 is configured to store the binary for the ndOS. The persistent memory 164 may be implemented using any non-transitory storage mechanism, e.g., magnetic storage, optical storage, solid state memory, etc.

In one embodiment, the volatile memory 166 is configured to temporarily store packets in one or more queues 168. The volatile memory may be implemented using any non-persistent memory, e.g., RAM, DRAM, etc. In one embodiment, each of the queues is configured to only store packets for a specific flow. In one embodiment, a flow corresponds to a group of packets that all satisfy a given classification rule.

It is noted that the embodiments illustrated in FIG. 9 are exemplary. Other embodiments may utilize different communication interfaces (Ethernet, Ethernet over Openflow, PCIe, PCI, etc.), network devices with less components or additional components, arrange the components in a different configuration, include additional interconnects or have fewer interconnects, etc. The embodiments illustrated in FIG. 9 should therefore not be interpreted to be exclusive or limiting, but rather exemplary or illustrative.

Figure 10:
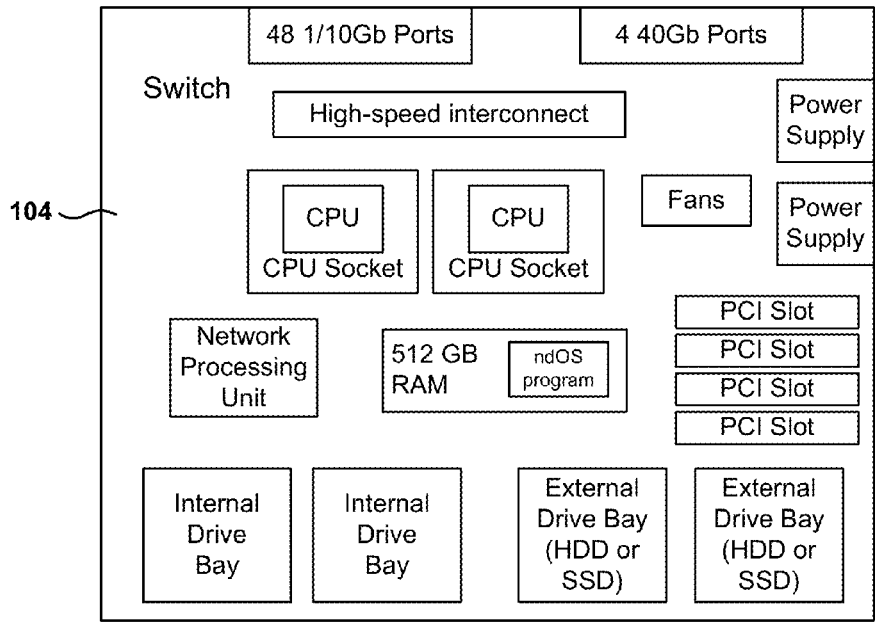
FIG. 10 illustrates an exemplary embodiment of a network device.

FIG. 10 illustrates an exemplary embodiment of a network device. The exemplary ndOS switch 104 includes a plurality of Ethernet ports (e.g., 48 1/10 Gb ports and 4 40 Gb ports), a high-speed interconnect that connects the internal modules within the switch (e.g., PCIe, Ethernet), and 2 CPU sockets for hosting 2 respective CPUs.

The ndOS switch 104 further includes a networking processing unit and RAM (e.g., 512 Gb), which may host the ndOS program while being executed by the one or more CPUs. The switch 104 further includes 2 drive bays for internal non-volatile storage, and 2 external drive bays for external storage (e.g., hard disk drive (HDD) or solid state drive (SSD)). Additionally, the ndOS switch 104 includes one or more power supplies, PCI slots (e.g., 4 PCI slots), and fans.

It is noted that the embodiment illustrated in FIG. 10 is exemplary. Other embodiments may utilize different components, have more or less amount of any of the components, include additional components, or omit one or more components. The embodiment illustrated in FIG. 10 should therefore not be interpreted to be exclusive or limiting, but rather exemplary or illustrative.

Figure 11:
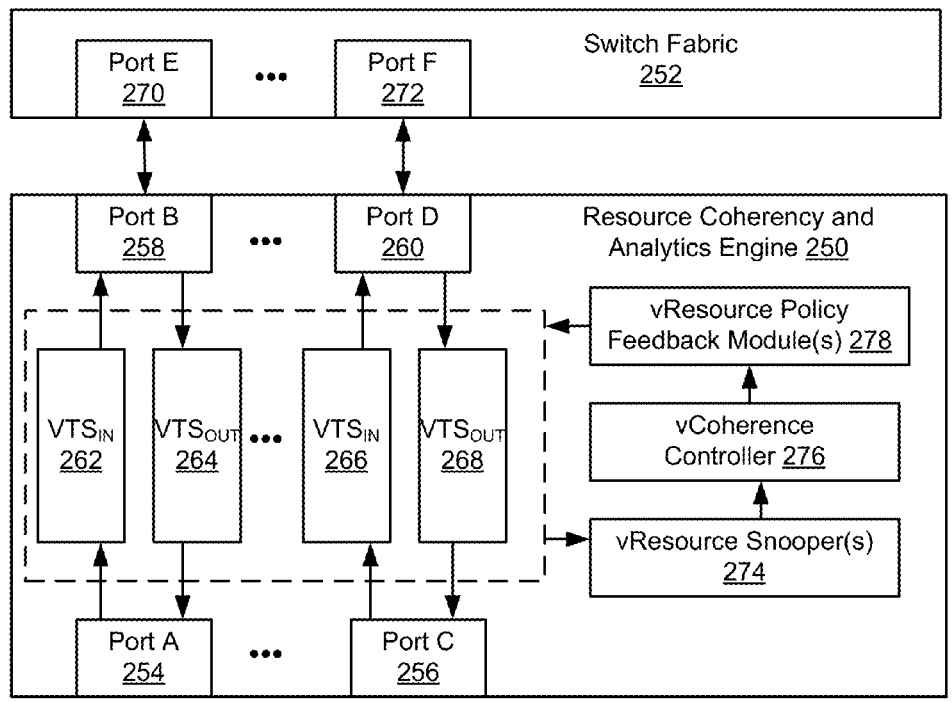
FIG. 11 illustrates a resource coherency and analytics engines in accordance with one or more embodiments.

FIG. 11 illustrates resource coherency and analytics engines in accordance with one or more embodiments. The Resource Coherency and Analytics engine (RCAE) 250 interacts with a switch fabric 272 in accordance with one or more embodiments. The RCAE 250 includes ports (e.g., 254, 256, 258, 260) configured to receive packets from a network (e.g., a wide area network (WAN), a local area network (LAN), the Internet) or the switch fabric 252 and to provide the packets to the appropriate virtual traffic shaper (VTS) (e.g., 262, 264, 266, 268). The ports in the RCAE may also be used to transmit packets to a network or to the switch fabric. The switch fabric 252 is configured to receive packets from and send packets to the RCAE via ports (e.g., 270, 272) in the switch fabric.

Each VTS is configured to process the packets received from the aforementioned ports and, if appropriate, send the packets to another port in the RCAE. The VTS processes the packets based on operating parameters set by the vCoherence Controller (VCC) 276. In one embodiment, the operating parameters may be determined based on one or more of the VRCLs.

The operating parameters may include, but are not limited to, virtual output queue (VOQ) length, drain rate of VOQ (referred to as "drain rate"), cut-through policies, and VOQ scheduling policies. In one embodiment, the VOQ length corresponds to a maximum number of packets that may be queued in the VOQ at any one time. In one embodiment, the drain rate corresponds to the rate at which packets queued in a given VOQ are removed from the VOQ and scheduled for transmission. The drain rate may be measured as data units/unit time, e.g., megabits/second. In one embodiment, cut-through policies correspond to policies used to determine whether a given packet should be temporarily stored in a VOQ or if the packet should be sent directly to a VOQ drainer. In one embodiment, VOQ scheduling policies correspond to policies used to determine the order in which VOQs in a given VTS are processed.

The VCC 276 obtains RCAE statistics from the vResource Snooper (VRS) 274 and uses the RCAE statistics to update and/or modify, as necessary, the operating parameters for one or more VTSs in the RCAE. In one embodiment, the VCC 276 may obtain RCAE statistics directly from the individual VTSs. Those skilled in the art will appreciate that other mechanisms may be used to obtain the RCAE statistics from the VTS by the VCC without departing from the embodiments.

In some embodiments, the VCC 276 includes functionality to obtain RCAE statistics from all VRSs 274 in the RCAE and then to change the drain rates (described below) for one or more VOQ drainers based on the RCAE statistics obtained from all (or a portion) of the VTSs. The VCC 276 may also provide particular RCAE statistics to the VTS or components within the VTS, e.g., the VRCL enqueuer and VOQ Drainer, in order for the VTS (or components therein) to perform their functions.

The RVS 274 is configured to obtain RCAE statistics from the individual VTSs. The RCAE statistics may include, but are not limited to, (i) packets received by VTS, (ii) packets dropped by VRG classifier, (iii) packets dropped by the VRCL enqueuer, (iv) packets queued by each VOQ in the VTS, (v) number of cut-through packets, (vi) queue length of each VOQ in the VTS, (vi) number of packets scheduled for transmission by VOQ drainer, and (vii) latency of VTS. The RCAE statistics may be sent to the VRS 274 as they are obtained or may be sent to the VRS 274 at various intervals. Further, the RCAE statistics may be aggregated and/or compressed within the VTS prior to being sent to the VRS 274.

In one embodiment, updates or modifications to the operating parameters of the one or more VTSs are sent to the vResource Policy Feedback Module (RPFM) 278. The RPFM 278 communicates the updates and/or modifications of the operating parameters to the appropriate VTSs. Upon receipt, the VTSs implement the updated and/or modified operating parameters. In another embodiment, any updates or modifications to the operating parameters of the one or more VTSs are sent directly to the VTSs from the VCC.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The e also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A network switch comprising:
   a plurality of ports, the network switch being configured to switch packets of a layer 2 network received on the plurality of ports;
   a memory for storing a tunneling engine computer program; and
   a processor configured to execute the tunneling engine, wherein the processor is configured to identify a second switch configured to switch packets of the layer 2 network, the identification including detecting that the second switch is connected to the network switch over a layer 3 connection, wherein the tunneling engine is configured to create a tunnel over the layer 3 connection between the network switch and the second switch that is maintained in said memory in a global MAC address table to exchange packets of the layer 2 network, the global MAC address table of said network switch and said second switch maintained with updates of information regarding the tunnel and other tunnels, the exchange of packets over the tunnel including encapsulation and decapsulation of the packets that are exchanged between the network switch and the second switch, wherein when the processor determines that a received packet of the layer 2 network is from a first node and addressed to a second node connected to the second switch, the processor creates an encapsulation flow on the network switch to encapsulate packets from the first node to the second node over the tunnel that was accessed from said memory for said exchange of packets;
   wherein the tunnel is created without processing by the first node or the second node,
   wherein the processor is configured to exchange data between the network switch and the second switch to maintain the updates of information regarding the tunnel and other tunnels stored or to be stored in the global MAC address table of the memory.

2. The network switch of claim 1, further including a switch fabric, wherein the switch fabric is configurable by the processor to perform tunneling to the second switch for one or more flows.

3. The network switch of claim 2, wherein the switch fabric is connected to the processor via PCIExpress.

4. The network switch of claim 3, wherein the switch fabric is connected to the processor via ethernet utilizing openflow protocol.

5. The network switch of claim 1, wherein the network switch is configured to exchange information with other switches supporting a common network device operating system (ndOS) to share data from the global MAC address table for nodes coupled to any of the switches supporting ndOS.

6. The network switch of claim 1, wherein when an ARP message or a MAC miss in a MAC table associated with the layer 2 network is received by one of the ndOS switches, the ndOS switches share information regarding port, switch, MAC address, and VLAN based on the ARP message or MAC miss.

7. The network switch of claim 1, wherein the first node and the second node have IP addresses in a same subnet associated with the layer 2 network, wherein the first node and the second node are one of a server, or a mobile device, or a virtual machine, or a personal computing device.

8. The network switch of claim 1, wherein tunneling messages between the network switch and the second switch is transparent to the first node and to the second node.

9. The network switch of claim 1, wherein the processor identifies the second switch when the processor receives an administrator command to connect fabrics of the network switch and the second switch.

10. The network switch of claim 1, wherein the processor identifies the second switch when the processor receives a fabric connect message from the second switch.

11. The network switch of claim 1, wherein the tunnel is transparent to the first node and the second node.

12. A method executed by a network switch having a memory and a processor, comprising:
   identifying, at the network switch configured to switch packets of a layer 2 network, a second switch configured to switch packets of the layer 2 network, the identifying including detecting that the second switch is connected to the network switch over a layer 3 connection;
   creating, at the network switch, a tunnel over the layer 3 connection between the network switch and the second switch that is maintained in the memory in a global MAC address table to exchange packets of the layer 2 network, the global MAC address table of said network switch and said second switch maintained with updates of information regarding the tunnel that was created and other created tunnels, the exchange of packets over the tunnel including encapsulation and decapsulation of the packets that are exchanged between the network switch and the second switch;

receiving, at the network switch, a packet of the layer 2 network, the packet being from a first node and addressed to a second node;

determining, at the network switch, that the second node is connected to the second switch;

detecting that the network switch is connected to the second switch via a tunnel implemented over a layer 3 connection that was accessed from said memory for said exchange of packets; and creating, on the network switch, a first encapsulation flow to encapsulate packets from the first node to the second node over the tunnel and a first decapsulation flow to decapsulate packets from the second node to the first node, wherein the second switch creates a second encapsulation flow to encapsulate packets from the second node to the first node over the tunnel and a second decapsulation flow to decapsulate packets from the first node to the second node;

wherein the tunnel is created without processing by the first node or the second node, wherein the processor is configured to exchange data between the network switch and the second switch to maintain the updates of information regarding the tunnel and other tunnels stored or to be stored in the global MAC address table of the memory.

13. The method as recited in claim 12, further including:
sending the packet from the network switch to the second switch over the tunnel using the encapsulation and decapsulation, the tunnel being created without processing by the first node or the second node.

14. The method as recited in claim 12, wherein the first node is a first virtual machine (VM) in a first server and the second node is a second VM in a second server.

15. The method as recited in claim 14, wherein the tunnel between the network switch and the second switch is transparent to the first server and the second server, wherein the tunnel allows the first server and the second server to avoid having a direct tunnel between the first server and the second server which would require resource utilization in the first server and the second server.

16. The method as recited in claim 12, wherein sending the packet over the tunnel further includes:
encapsulating the packet into a VXLAN message.

17. The method as recited in claim 12, wherein the network switch and the second switch are not directly connected over a layer 2 connection when the tunnel is created, wherein the network switch and the second switch exchange information to share data from the global MAC address table for nodes coupled to the network switch and the second switch, wherein detecting that the network switch is connected to the second switch is based on information in the global MAC address table.

18. A non-transitory computer-readable storage medium storing a computer program to be executed by a network switch having a memory and a processor, the computer-readable storage medium comprising:
program instructions for identifying, at the network switch configured to switch packets of a layer 2 network, a second switch configured to switch packets of the layer 2 network, the identifying including detecting that the second switch is connected to the network switch over a layer 3 connection;

program instructions for creating, at the network switch, a tunnel over the layer 3 connection between the network switch and the second switch that is maintained in the memory in a global MAC address table to exchange packets of the layer 2 network, the global MAC address table of said network switch and said second switch maintained with updates of information regarding the tunnel that was created and other created tunnels, the exchange of packets over the tunnel including encapsulation and decapsulation of the packets that are exchanged between the network switch and the second switch;

program instructions for receiving, at the network switch, a packet of the layer 2 network, the packet being from a first node and addressed to a second node;

program instructions for determining, at the network switch, that the second node is connected to the second switch; and program instructions for creating an encapsulation flow on the network switch to encapsulate packets from the first node to the second node over the tunnel;

wherein the tunnel is created without processing by the first node or the second node, wherein the processor is configured to exchange data between the network switch and the second switch to maintain the updates of information regarding the tunnel and other tunnels stored or to be stored in the global MAC address table of the memory.

19. The storage medium as recited in claim 18, wherein the packet is addressed to an IP address associated with the layer 2 network.

20. The storage medium as recited in claim 18, wherein tunneling of messages between the network switch and the second switch is transparent to the first node and the second node.

21. The storage medium as recited in claim 18, wherein the first node is a first virtual machine (VM) in a first server and the second node is a second VM in a second server, wherein the tunnel between the network switch and the second switch is transparent to the first server and the second server, wherein the tunnel allows the first server and the second server to avoid having a direct tunnel between the first server and the second server which would require resource utilization in the first server and the second server.

\* \* \* \* \*